US011662934B2

(12) United States Patent
Roberts et al.

(10) Patent No.: US 11,662,934 B2
(45) Date of Patent: May 30, 2023

(54) MIGRATION OF A LOGICAL PARTITION BETWEEN MUTUALLY NON-COHERENT HOST DATA PROCESSING SYSTEMS

(71) Applicant: INTERNATIONAL BUSINESS MACHINES CORPORATION, Armonk, NY (US)

(72) Inventors: Steven Leonard Roberts, Cedar Park, TX (US); David A. Larson Stanton, Rochester, MN (US); Peter J. Heyrman, Rochester, MN (US); Stuart Zachary Jacobs, Lakeville, MN (US); Christian Pinto, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 17/122,035

(22) Filed: Dec. 15, 2020

(65) Prior Publication Data

US 2022/0188007 A1 Jun. 16, 2022

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
CPC ..... G06F 3/0647; G06F 3/0604; G06F 3/0679
See application file for complete search history.

(56) References Cited

U.S. PATENT DOCUMENTS

| 7,484,208 | B1 * | 1/2009 | Nelson | G06F 3/0647 718/1 |
| 9,836,402 | B1 * | 12/2017 | Riel | G06F 12/084 |
| 10,367,712 | B2 | 7/2019 | Singh | |
| 10,380,282 | B2 | 8/2019 | Micou et al. | |

(Continued)

OTHER PUBLICATIONS

Vmware, "VMware vSphere® vMotion® Architecture, Performance and Best Practices in VMware vSphere® 5", 2011 https://www.vmware.com/content/dam/digitalmarketing/vmware/en/pdf/techpaper/vmware-vmotion-performance-vsphere5.pdf (Year: 2011).*

(Continued)

*Primary Examiner* — Charles Rones
*Assistant Examiner* — Alexander Vinnitsky
(74) *Attorney, Agent, or Firm* — Brian F. Russell; Nathan Rau

(57) ABSTRACT

A data processing system includes a system fabric, a system memory, a memory controller, and a link controller communicatively coupled to the system fabric and configured to be communicatively coupled, via a communication link to a destination host with which the source host is non-coherent. A plurality of processing units is configured to execute a logical partition and to migrate the logical partition to the destination host via the communication link. Migration of the logical partition includes migrating, via a communication link, the dataset of the logical partition executing on the source host from the system memory of the source host to a system memory of the destination host. After migrating at least a portion of the dataset, a state of the logical partition is migrated, via the communication link, from the source (Continued)

host to the destination host, such that the logical partition thereafter executes on the destination host.

21 Claims, 17 Drawing Sheets

(56) References Cited

U.S. PATENT DOCUMENTS

| | | | |
|---|---|---|---|
| 10,579,434 B2 | 3/2020 | Harkness et al. | |
| 10,643,010 B2 | 5/2020 | Lewis et al. | |
| 10,901,738 B2* | 1/2021 | Gschwind | G06F 9/30138 |
| 11,169,835 B1 | 11/2021 | Duong | |
| 11,188,375 B2* | 11/2021 | Mansur | G06F 9/45558 |
| 2012/0017031 A1 | 1/2012 | Mashtizadeh | |
| 2018/0113644 A1* | 4/2018 | Arroyo | G06F 13/4068 |
| 2018/0139101 A1 | 5/2018 | Puri | |
| 2018/0165107 A1* | 6/2018 | Elzur | G06F 9/45558 |
| 2019/0065231 A1* | 2/2019 | Schmisseur | G06F 9/5088 |
| 2020/0026556 A1* | 1/2020 | Chitlur | G06F 9/4856 |
| 2020/0150997 A1 | 5/2020 | Chang et al. | |
| 2021/0165675 A1 | 6/2021 | Wang | |
| 2021/0232468 A1 | 7/2021 | Tidke | |

OTHER PUBLICATIONS

Newbedev, "software threads vs hardware threads", 2021 https://newbedev.com/software-threads-vs-hardware-threads (Year: 2021).*
Reconfigurable Computing with the Partitioned Global Address Space Model, Willenberg, R. et al.; Aug. 2012.
A Heterogeneous GASNet Implementation for FPGA-Accelerated Computing, Willenberg, R. et al.; 2013.
Heterogeneous Runtime Support for Partitioned Global Address Space Programming on FPGAs, Willenberg, R.; 2016.
Data Partition and Migration for High Performance Computation in Distributed Memory Multiprocessor, Anupindi, N.; 1994.
Live Virtual Machine Migration across Hypervisor Systems by Leveraging the Commonality in Memory Contents of To-Be Migrated VM and of VMs Hosted on Destination Hypervisor, Anonymously; May 15, 2012.
Method to Reduce the Time for Live Partition Migration Via Cooperative Approach by Database Manager, Anonymously; May 28, 2012.
Ultilizing AMD (Active Memory De duplication) to Optimize Network Bandwidth and Improve the Performance During LPM (Live Partition Migration), Anonymously; Jan. 21, 2015.
Migration of Multi-Process Application with Shared Address Space, Anonymously; Nov. 29, 2012.
PCT International Search Authority, International Search Report and Written Opinion, dated Nov. 28, 2022, 7 pages.

* cited by examiner

```
       ⋮              700                ⋮              800
                     ↙                                 ↙
ST data;     ─ 702          L: LD flag;   ─ 802
<barrier>    ─ 704             cmp flag, 1 ─ 804
ST flag, 1   ─ 706             beq getit   ─ 806
                               br L        ─ 808
       ⋮                    getit: LD data ─ 810
                                    ⋮
```

MIGRATION OF A LOGICAL PARTITION BETWEEN MUTUALLY NON-COHERENT HOST DATA PROCESSING SYSTEMS

BACKGROUND OF THE INVENTION

The present invention relates generally to data processing and, in particular, to memory migration within a multi-host data processing environment.

In general, cloud computing refers to a computational model in which data processing, data storage, and network resources, software, and data are accessible to remote data processing systems, where the details of the underlying information technology (IT) infrastructure providing such resources is transparent to consumers of cloud services. In various implementations, the IT infrastructure can be on-premises or off-premises (or a hybrid of the two) with respect to cloud consumers. Further, the cloud computing resources can be (but are not required to be) widely geographically and/or topologically distributed.

Cloud computing is facilitated by ease-of-access to remote computing websites (e.g., via the Internet or a private corporate network) and frequently takes the form of web-based resources, tools, or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of cloud computing has been facilitated by the widespread utilization of virtualization, which is the creation of virtual (rather than actual) instances of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different cloud computing customers. The virtualization of actual IT resources and management of VMs is typically provided by software referred to as a VM monitor (VMM) or hypervisor.

In a typical virtualized computing environment, VMs and VMMs can communicate with each other and with physical entities in the IT infrastructure of the computing environment utilizing conventional input/output (I/O) and networking protocols. As is known in the art, conventional networking protocols are commonly premised on the well-known seven layer Open Systems Interconnection (OSI) model, which includes (in ascending order) physical, data link, network, transport, session, presentation and application layers. In some implementations, VMs and VMMs are enabled to communicate with other network entities as if the VMs and VMMs were physical network elements through the substitution of a virtual network connection for the conventional physical layer connection. This conventional virtualized I/O and network infrastructure is referred to in the art as a virtual input-output server (VIOS).

In a cloud computing environment as described, computational workloads can generally be characterized as including two components: a workload state maintained in the registers and caches of the physical host executing the workload and a workload dataset residing in the data storage of the physical host. These computational workloads are frequently transferred between physical hosts for various reasons, including, for example, data processing system maintenance and upgrades, load balancing, regulatory compliance, security, and resource optimization.

According to one conventional technique of transferring an executing workload from a source host to a destination host, the operating systems or hypervisors of the source and destination hosts first coordinate copying of the workload dataset from the memory of the source host to the memory of the destination host via the VIOS on a memory page-by-memory page basis. After the workload dataset is successfully transferred, the operating systems or hypervisors of the source and destination hosts coordinate transfer of the workload state from the source host to the destination host via the VIOS. As the workload continues to run on the source host during the transfer of the workload from the source host to the destination host, the workload commonly continues to both read from and write to the workload dataset. Using this technique, each update (write) by the source host to a memory page that has already been transferred to the destination host necessitates a second transfer of the now-updated memory page, thus lengthening the time required for the workload migration in an unpredictable way.

In an alternative technique, the operating systems or hypervisors of the source and destination hosts first coordinate transfer of the workload state from the source host to the destination host via the VIOS, begin execution of the workload on the destination host, and thereafter migrate memory pages from the source host to the destination host based on demand-paging. Thus, each time the workload executing on the destination host generates an access request for data in a memory page residing on the source host, a software page fault is generated, and the operating systems or hypervisors handle the page fault by copying the requested memory page from the source host to the destination host via the VIOS. Using this alternative technique, memory pages are transferred from the source host to the destination host only once, but the workload suffers from poor responsiveness during the entire period of workload migration due to the significant latency required to service each demand paging request.

Both of the conventional workload migration techniques described herein transfer of the workload between non-coherent hosts utilizing the VIOS, which is characterized by high communication overhead and latency due, in part, to the many protocol layers that must be traversed to communicate the workload data set and workload state between hosts.

BRIEF SUMMARY

The various embodiments of the present invention provide support for live migration of a workload between non-coherent hosts while avoiding the communication overhead and latency associated with VIOS (or external networks) while transferring the workload state and workload dataset.

In at least one embodiment, a data processing system that serves a source host from which a logical partition is migrated can include a system fabric, a system memory, a memory controller of the system memory that is communicatively coupled to the system fabric, and a link controller communicatively coupled to the system fabric and configured to be communicatively coupled via a communication link to a destination host with which the source host is non-coherent. The source host additionally includes a plurality of processing units communicatively coupled to the system fabric. The plurality of processing units is configured, for example, by a hypervisor or virtual machine monitor, to execute a logical partition having a dataset residing in the system memory and to migrate the logical partition to the destination host via the communication link. Migration of the logical partition includes migrating, via a communication link, the dataset of the logical partition executing on the source host from the system memory of the source host to a system memory of the destination host. After migrating at least a portion of the dataset, a state of the logical partition is migrated, via the communication link, from the source host to the destination host, such that the logical partition thereafter executes on the destination host. This migration technique provides reduced latency for the migration and improved jitter for the logical partition.

Aspects of the invention can also be implemented as a method of data processing. In one example, the method can include migrating, via a communication link, a dataset of a logical partition executing on a source host from the system memory of the source host to a system memory of a destination host that is non-coherent with respect to the source host. After migrating at least a portion of the dataset, a state of the logical partition is migrated, via the communication link, from the source host to the destination host. After migrating the state of the logical partition to the destination host, the logical partition is executed on the destination host.

Aspects of the invention can also be implemented as a program product. In one example, the program product includes a computer-readable storage device and program code, stored within the computer-readable storage device, which when executed by a data processing system serving as a source host causes the data processing system to migrate, via a communication link, a dataset of a logical partition executing on a source host from the system memory of the source host to a system memory of a destination host that is non-coherent with respect to the source host. The program code also causes the data processing system, after migrating at least a portion of the dataset, to migrate, via the communication link, a state of the logical partition from the source host to the destination host, such that the logical partition is executed on the destination host.

In some examples or operating scenarios, migrating the dataset includes migrating at least some of the dataset of the logical partition from the source host to the destination host after the logical partition begins execution on the destination host.

In some examples or operating scenarios, migrating the dataset includes the source host copying one or more memory pages of the dataset to system memory in the destination host based on requests of the destination host.

In some examples or operating scenarios, migrating the dataset includes the source host initiating copying of one or more memory pages of the dataset to system memory in the destination host.

In some examples or operating scenarios, the dataset includes a plurality of memory pages, each having a respective associated page table entry defining a virtual-to-real address translation for the associated memory page and the source host tracks in a data structure which page table entries for the plurality of memory pages have been migrated to the destination host.

In some examples or operating scenarios, migrating the dataset includes the source host issuing on a system fabric a store request specifying a real address in a system memory of the destination host, a link controller in the source host receiving the store request and, based on the real address, transmitting the store request via the communication link to a memory controller within the destination host.

In some examples, the method of claim 1, wherein migrating the dataset includes the source host performing a bulk flush of all memory pages in the dataset that are subject to update by the source host from the caches of the source host to system memory.

In some examples, the source host coordinates migration of the logical partition from the source host to the destination host utilizing communication via a network connection, such as a virtual input-output server (VIOS), but refrains from migrating the dataset and the state of the logical partition via the network connection.

BRIEF DESCRIPTION OF THE SEVERAL VIEWS OF THE DRAWINGS

FIG. 7 illustrates an exemplary write primitive by which two host data processing systems can communicate in accordance with one embodiment;

FIG. 8 illustrates an exemplary read primitive by which two host data processing systems can communicate in accordance with one embodiment;

DETAILED DESCRIPTION

Figure 1:
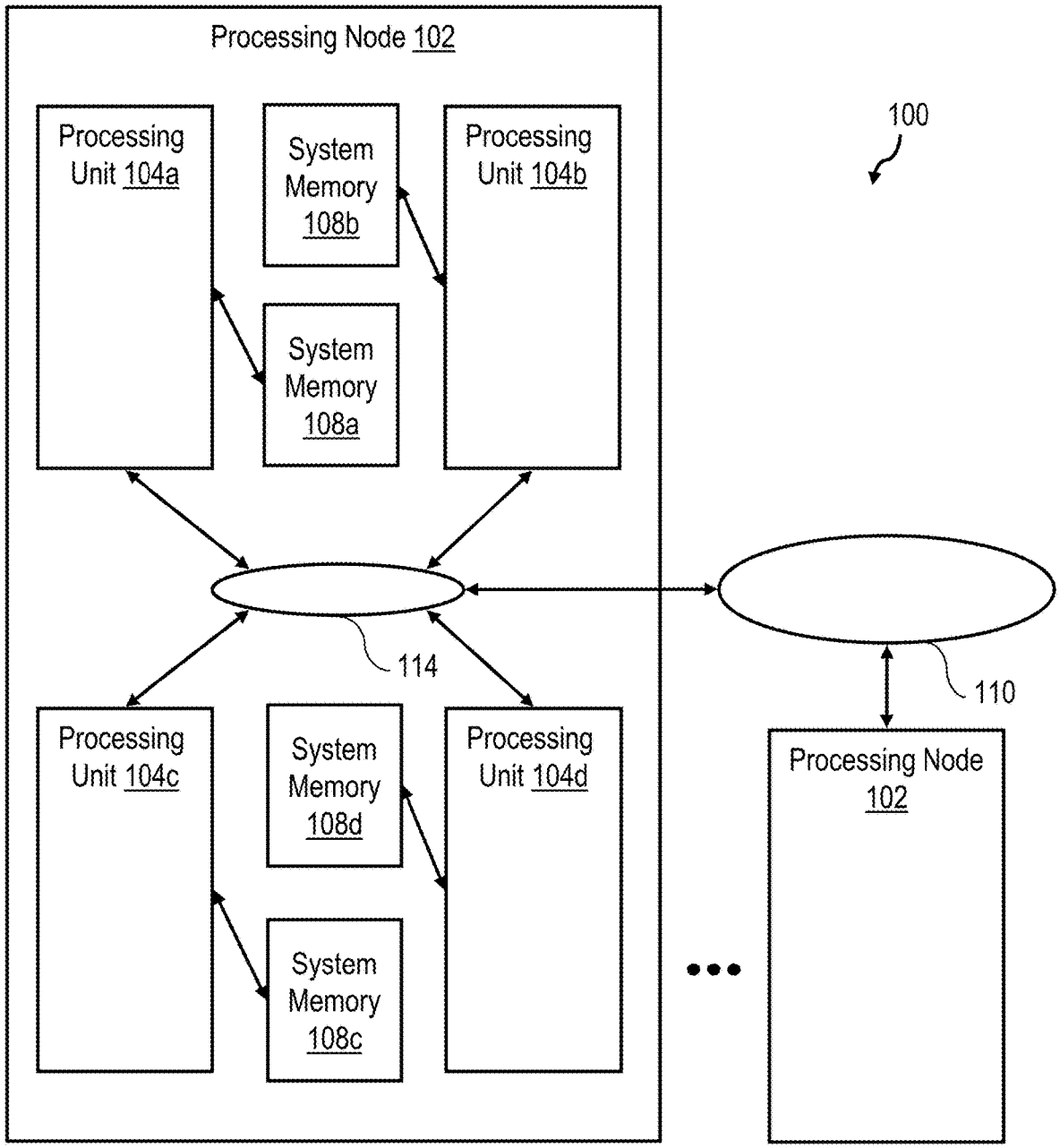
FIG. 1 is a high-level block diagram of an exemplary host data processing system in accordance with one embodiment.

With reference now to the figures, in which like reference numerals refer to like and corresponding parts throughout, and in particular with reference to FIG. 1, there is illustrated a high-level block diagram depicting an exemplary data processing system 100 in accordance with one embodiment. In various use cases and topologies, a data processing system such as data processing system 100, which includes hardware components and may additionally include software and/or firmware components, may be referred to in the art as a "host" or "host data processing system." In various operating scenarios, any given host may be a source host from which a workload (e.g., a logical partition) can be migrated or a destination host to which a workload is migrated.

In the depicted embodiment, host data processing system 100 is a cache-coherent multiprocessor (MP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing one or more (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric. In at least some preferred embodiments, communication on the system fabric is compliant with a so-called host bus protocol, which defines, inter alia, predetermined sets of legal requests, responses, and control information communicated between communication participants (e.g., caches, memory controllers, etc.) via the system fabric.

As described below in greater detail with reference to FIG. 2, in some embodiments, one or more of processing units 104 (and possibly all of processing units 104) each include a memory controller 106 coupled to local interconnect 114 to provide an interface to a respective system memory 108 (e.g., one of system memories 108a-108d). Data and instructions residing in system memories 108 can generally be accessed, cached and modified by a processor core in any processing unit 104 of any processing node 102 within data processing system 100. In alternative embodiments, one or more memory controllers 106 (and system memories 108) can be directly coupled or indirectly coupled (e.g., via a switch) to system interconnect 110 rather than a local interconnect 114.

Those skilled in the art will appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
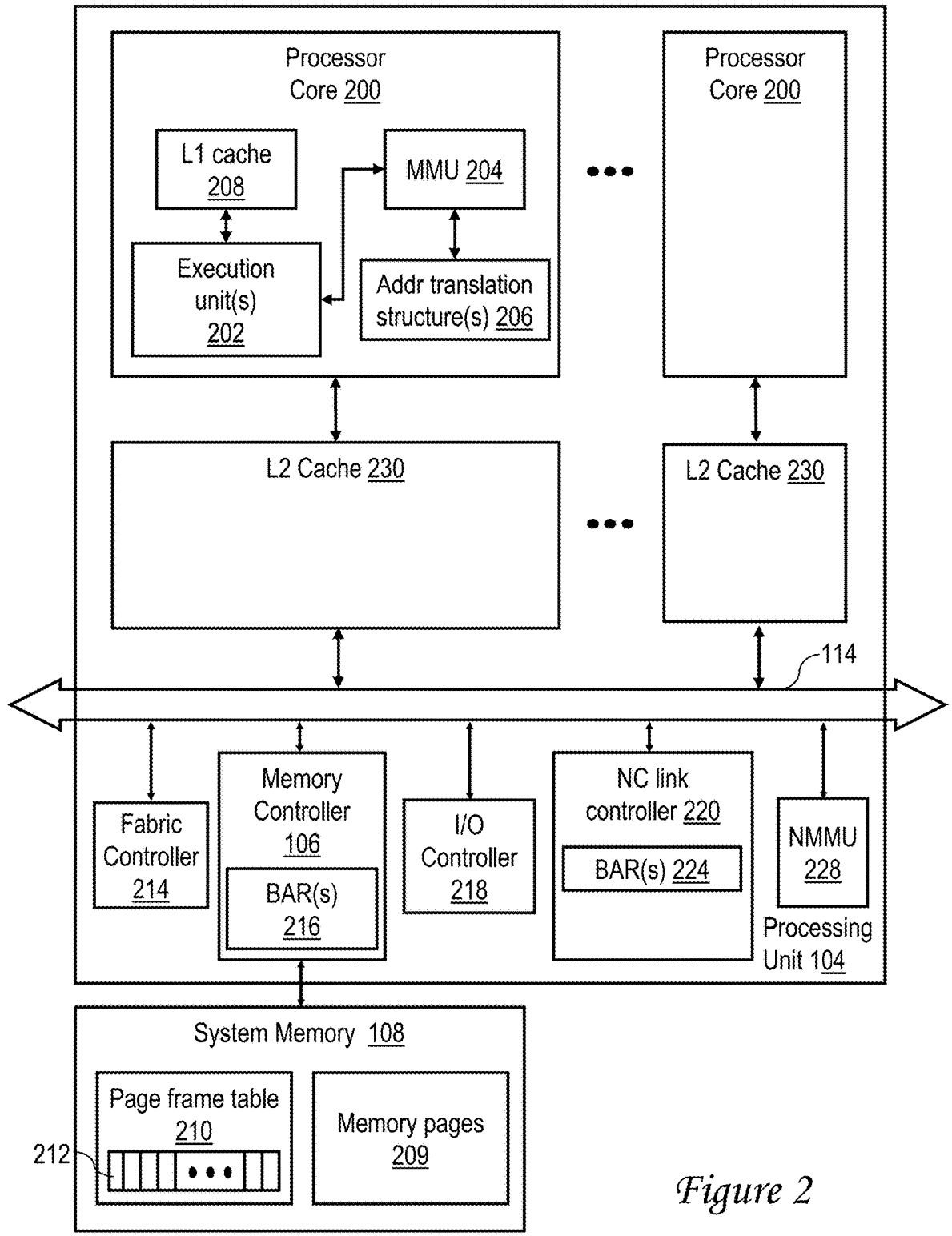
FIG. 2 is a more detailed block diagram of an exemplary processing unit of a host data processing system in accordance with one embodiment.

Referring now to FIG. 2, there is depicted a more detailed block diagram of an exemplary processing unit 104 and a system memory 108 in accordance with one embodiment. In the depicted embodiment, each processing unit 104 is an integrated circuit including one or more processor cores 200 for processing instructions and data. In the depicted example, a processor core 200 includes one or more execution units 202 that is capable of executing instructions from one or multiple simultaneous hardware threads of execution.

Processor core 200 additionally includes a memory management unit (MMU) 204 responsible for translating effective addresses determined by the execution of memory-referent instructions in execution unit(s) 202 into real addresses within a real address space referenced by all processing units 104 within data processing system 100. MMU 204 performs effective-to-real address translation by reference to one or more translation structure(s) 206, such as a translation lookaside buffer (TLB), effective-to-real address translation (ERAT) cache, segment lookaside buffer (SLB), etc. The number and/or type of these address translation structures may vary between implementations and architectures. Address translation structure(s) 206 reduce the latency associated with address translation by buffering local copies of selected address translations, which may be retrieved from system memories 108, as discussed further below.

The operation of each processor core 200 is supported by a multi-level memory hierarchy having at its lowest level the composite system memory provided by the various system memories 108 and made accessible via memory controllers 106. The real address range(s) for which an individual memory controller 106 is responsible can be defined, for example, by hypervisor and/or operating system software, through the appropriate configuration of one or more base address registers (BARs) 216 within the memory controller 106. As illustrated, system memories 108 store a multiplicity of memory pages 209, which provide storage for, among other things, the datasets of various workloads (also referred to as "logical partitions" (LPARs)). Additionally, one or more system memories 108 store a page frame table 210 containing a plurality of page table entries (PTEs) 212, where each PTE 212 specifies an effective-to-real address translation for a respective corresponding memory page 209 present in one of system memories 108. PTEs 212 additionally specify access protections (e.g., read-only, read/write (R/W), etc.) for the different memory pages. PTEs 212 accessed from page frame table 210 by a MMU 204 may be cached by the MMU 204 for subsequent access, for example, in address translation structure(s) 206. Page frame table 210 can be established, maintained, and updated, for example, by operating system and/or hypervisor software executing within data processing system 100.

The multi-level memory hierarchy of each processor core 200 additionally includes one or more levels of cache memory, which in the illustrative embodiment include a store-through level one (L1) cache 208 within and private to each processor core 200 and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

In the depicted embodiment, each processing unit 104 further includes an integrated and distributed fabric controller 214 responsible for controlling the flow of operations on the system fabric in accordance with the host bus protocol and for implementing the coherency communication required to implement the desired cache coherency protocol. Processing unit 104 can further include an integrated I/O (input/output) controller 218 supporting the attachment of one or more I/O devices and/or I/O channels (not illustrated).

Figure 3:
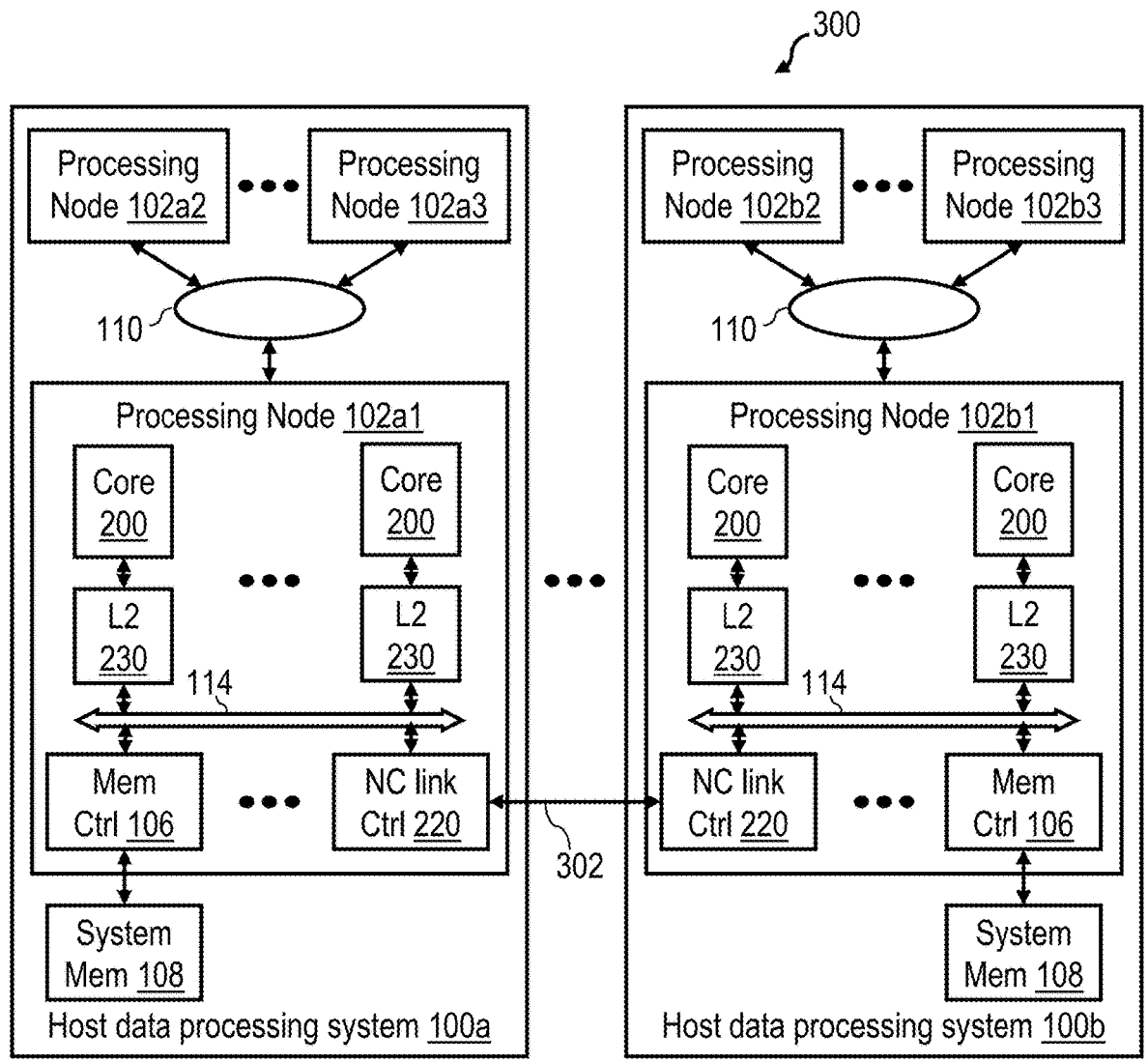
FIG. 3 illustrates an exemplary data processing system environment in which multiple hosts are coupled together by a non-coherent communication link in accordance with one embodiment.

In the depicted example, processing unit 104 also includes an attached non-coherent (NC) link controller 220 that, in at least one operating mode, supports the attachment to host data processing system 100 of another host data processing system 100 via a non-coherent communication link. For example, FIG. 3 illustrates an exemplary data processing system environment 300 in which host data processing system 100a (including processing nodes 102a1-102a3) and host data processing system 100b (including processing nodes 102b1-102b3) are coupled together for communication by a non-coherent communication link 302. (Data processing system environment 300 can optionally include one or more additional hosts 100 coupled to host 100a and/or 100b by additional non-coherent communication links 302.) In such an arrangement, each of host data processing systems 100a, 100b maintains its own respective real address space that is non-coherent with the other host. The real addresses range(s) for which the NC link controller 220 in each host 100a, 100b is responsible can be defined, for example, by hypervisor and/or operating system software, through the appropriate configuration of one or more base address registers (BARs) 224 within the NC link controller 220. Once configured, a memory access request transmitted on the system fabric of a host 100 that specifies a real address within a real address range defined by BAR(s) 216 of a local memory controller 106 can be serviced by that memory controller 106 by reference to the associated system memory 108. A memory access request on the system fabric that specifies a real address within a real address range defined by BAR(s) 224 of NC link controller 220 is transmitted by the NC link controller 220 via NC communication link 302 to the other host 100a or 100b. Inbound memory access requests received by an NC link controller 220 via non-coherent communication link 302 are transmitted by the NC link controller 220 on the system fabric of the receiving host 100.

Referring again to FIG. 2, processing unit 104 additionally includes a nest memory management unit (NMMU) 228, which, upon request via the system fabric, provides address translations to other communication participants, such as NC link controller 220. It should be appreciated that in other embodiments, NMMU 228 may be communicatively coupled to provide address translations to communication participants including NC link controller 220 in an alternative or additional manner, for example, by being coupled to system interconnect 110 rather than to local interconnect 114.

Figure 4:
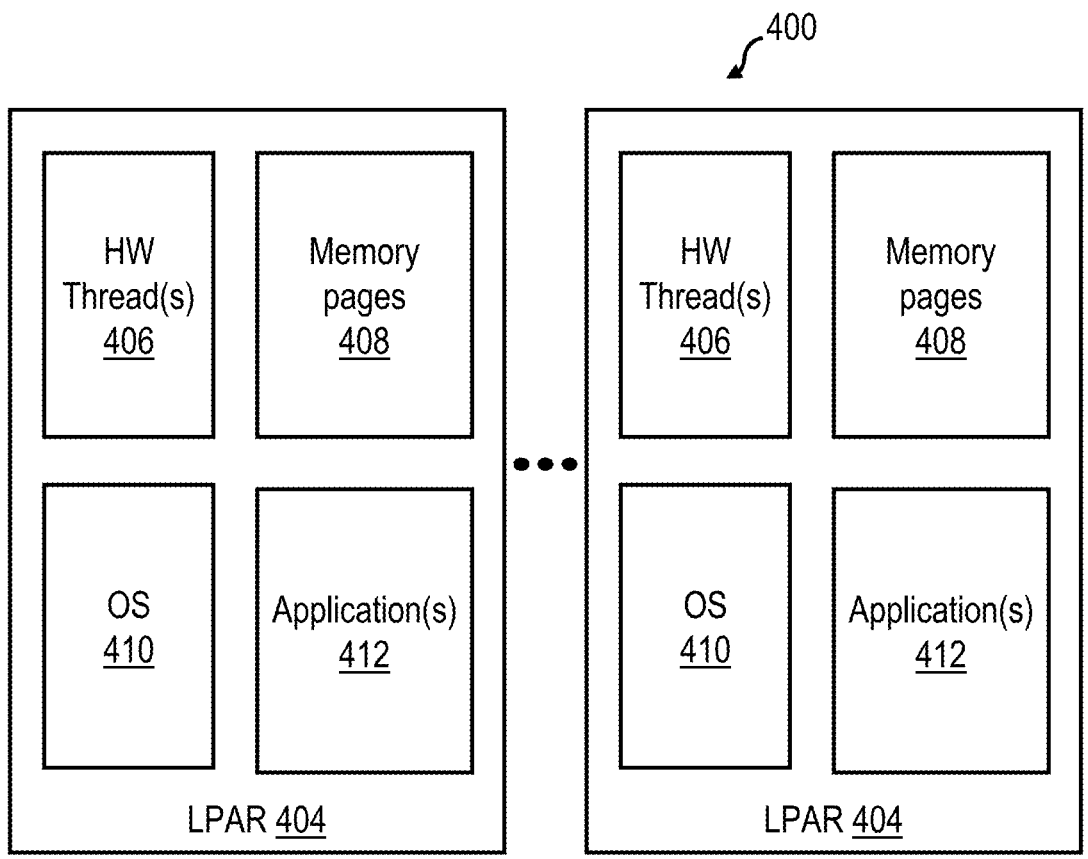
FIG. 4 depicts a logical view of a hypervisor and logical partitions of an exemplary host data processing system in accordance with one embodiment.

FIG. 4 depicts a logical view of the software configuration of a host 100a or 100b of FIGS. 1 to 3 in accordance with one embodiment. In this example, the software configuration 400 of each host 100 includes a hypervisor (or VMM) 402 that manages the hardware and software resources of the host 100. Hypervisor 402 virtualizes many of the underlying resources of host 100 through the implementation of one or more logical partitions (LPARs) 404. In this example, each LPAR 404 includes a specified number of hardware threads 406 within one or more processor cores 200 of the host 100, a collection of memory pages 408 (from memory pages 209) at specified real memory addresses for storing the dataset of the LPAR 404, an instance of an operating system 410 (e.g., Linux®, Windows®, Android®, iOS®, etc.), and a collection of application(s) 412 executing on the OS 410. Hypervisor 402 additionally supports network connections between LPARs 404 and between hypervisor 402 and other hosts 100 via a virtual input-output server (VIOS) 420 that virtualizes the physical network connection(s) to which the host 100 is coupled via I/O controller 218.

As discussed above, hypervisor 402 may determine that it is desirable or required to migrate a live workload, for example, one of LPARs 404, from its own host 100 to another host 100 for any of a variety of reasons. In accordance with the embodiments described herein, the migration preferably copies the dataset and state of the migrating LPAR 404 from the host 100 on which the LPAR 404 was initially executing (referred to herein as the "source host") to another host 100 on which the LPAR 404 continues its execution (referred to herein as the "destination host") over NC communication link 302 rather than over a virtualized network connection supported by VIOS 420 (as is conventional). Employing NC communication link 302 rather than VIOS 420 for the migration of the LPAR dataset has the advantage of reducing or eliminating duplicate transmission of the memory pages comprising the LPAR dataset, thus accelerating the LPAR migration. Employing NC communication link 302 additionally has the advantage of providing predictable response times for the application(s) 412 of the migrating LPAR.

Figure 5:
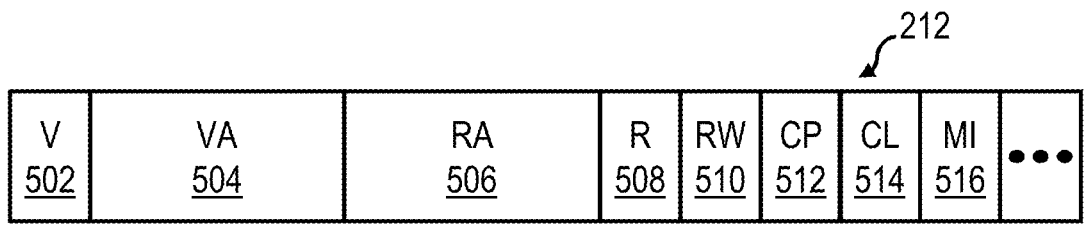
FIG. 5 illustrates an exemplary page table entry (PTE) in accordance with one embodiment.

With reference now to FIG. 5, there is illustrated an exemplary page table entry (PTE) 212 in accordance with one embodiment. In this example, PTE 212 includes a valid field 502 indicating whether or not the contents of PTE 212 are valid and thus available for use in translating virtual addresses to real addresses in an associated one of memory pages 209. In addition, PTE 212 includes a virtual address (VA) field 504 and a real address (RA) field 506 that respectively specify the virtual address and the real address assigned to the base storage location of the associated memory page 209. PTE 212 also includes one or more page protection fields indicating one or more attributes of the associated memory page 209. For example, in the illustrated embodiment, the page protection fields include a read (R) field 508 and a read-write (RW) field 510 respectively and alternatively indicating whether the associated memory page 209 is read-only or subject to both read and write access. Hereafter, it will be assumed that field values of R=1, RW=0 indicate the associated memory page 209 is a read-only memory page and field values of R=0, RW=1 indicate the associated memory page 209 is a read-write memory page.

In the illustrated embodiment, PTE 212 additionally includes one or more migration-related fields that may be utilized by hypervisors 402 to manage the migration of the associated memory page 209 from a system memory 108 of a source host 100 to a system memory 108 of destination host 100. In this embodiment, these migration-related fields include a copied (CP) field 512 indicating whether or not the associated memory page 209 has been copied from the source host 100 to the destination host 100, a cleaned (CL) field 514 indicating whether or not all data in the associated memory page 209 has been cleaned (i.e., all modified data has been written from cache memory to system memory 108 so that the image of the memory page in system memory 108 is consistent with any cached data), and a migration (MI) field 516 indicating whether or not the PTE 212 has been migrated (i.e., resides in the system memory 108 of the destination host 100) but not validated. It should be appreciated that the implementation of migration-related fields 512-516 in PTE 212 is a design choice and that other embodiments may omit these fields from PTE 212 and instead utilize one or more other data structures to manage the migration of an LPAR dataset.

Figure 6:
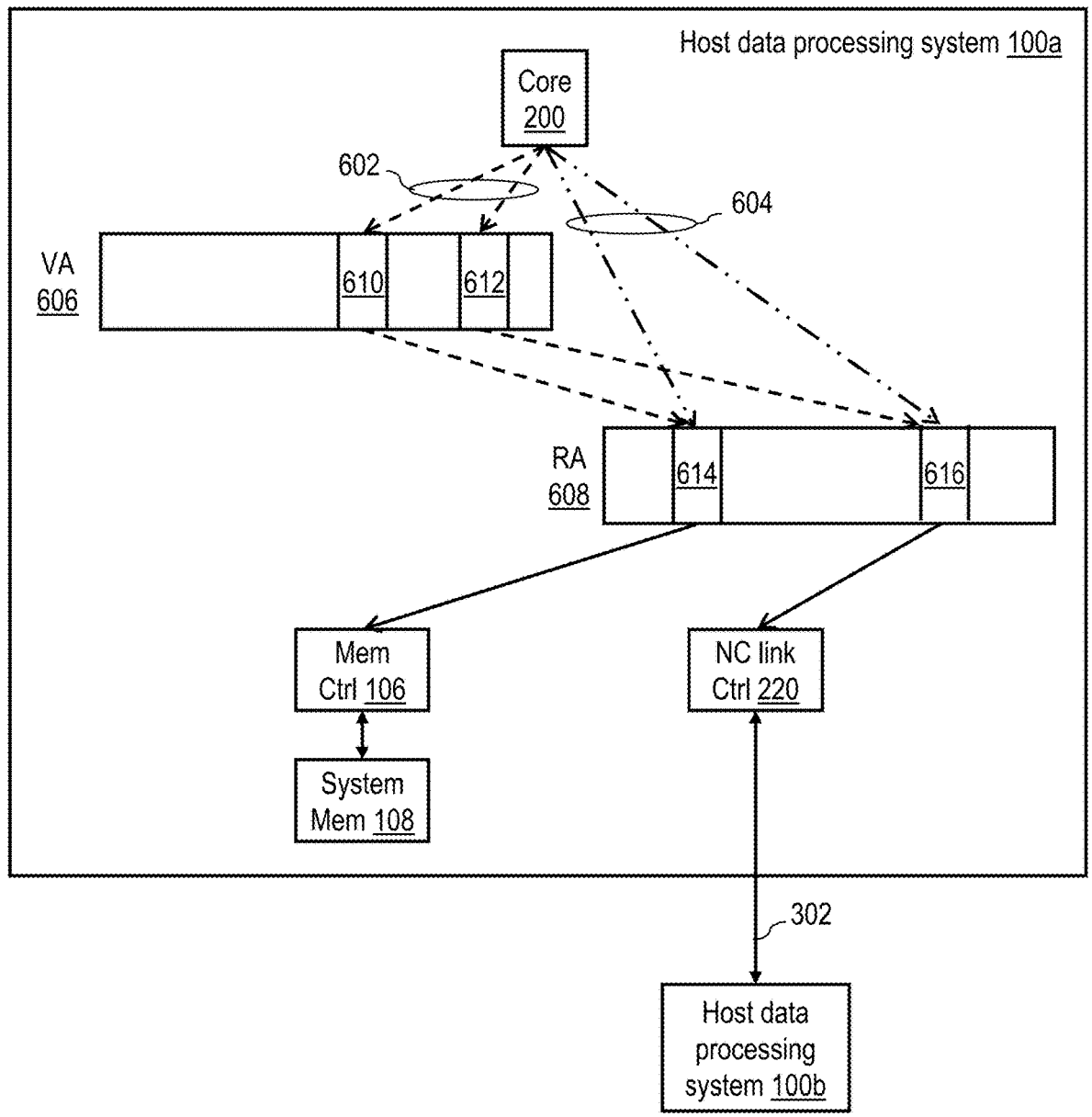
FIG. 6 depicts various memory access requests of an exemplary host data processing system in accordance with one embodiment.

Referring now to FIG. 6, various memory access requests of an exemplary host data processing system 100 are depicted. In FIG. 6, a core 200 of host data processing system 100 (e.g., host data processing system 100a) executes user-level instructions, for example, of an application 412, in a first hardware thread and executes instructions of a hypervisor 402 in a second hardware thread. The execution of the user-level instructions in the first hardware thread generates memory access requests 602, each of which specifies a respective target virtual (logical) address to be accessed (e.g., virtual address 610 or 612) in a virtual address space 606. As explained above, MMU 204 of core 200 translates each of the target virtual addresses 610, 612 into a respective real address 614 or 616 in real address space 608 based on the address translations provided by PTEs 212. In this example, real address 614 identifies a storage location in a system memory 108 of host data processing system 100a for which a local memory controller 106 is responsible. Real address 616, in contrast, identifies a storage location in a system memory 108 of a host data processing system 100b for which NC link controller 220 is responsible. Thus, a memory access request transmitted on the system fabric of host data processing system 100a can initiate access to a storage location in the local system memory 108 or a storage location in a remote system memory 108 of another host data processing system 100b (with which host data processing system 100a is non-coherent), depending on the assignment of real addresses by hypervisors 402 of host data processing systems 100a, 100b.

In at least some embodiments, memory access request of hypervisors 402 need not be subject to the same address translation applied to the target addresses of user-level memory access requests 602. For example, FIG. 6 further illustrates that the instructions of hypervisor 402 executed in the second hardware thread of core 200 may also generate memory access requests 604. However, in this case, memory access requests 604 directly specify real addresses 614, 616 in real address space 608. Consequently, hypervisor 402 of host data processing system 100a can access storage locations in the local system memory 108 of host data processing system 100a and storage locations in a remote system memory 108 of host data processing system 100b without using the virtual-to-real address translation recorded in PTEs 212.

With reference now to FIG. 7, there is illustrated an exemplary write primitive 700 by which one of host data processing systems 100a, 100b can write data into a system memory 108 of the other host 100a or 100b over a non-coherent communication link 302 in accordance with one embodiment. Write primitive 700 can form part of an instruction sequence of a hypervisor 402, OS 410, or application 412.

Figure 9:
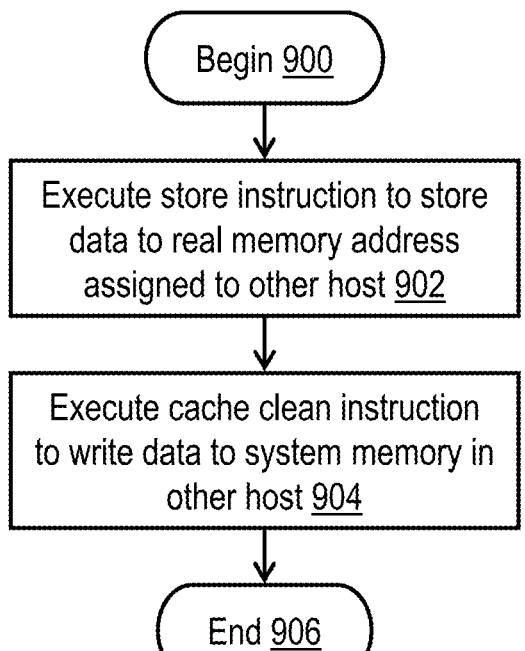
FIG. 9 is a high-level logical flowchart of an exemplary store operation in the write primitive of FIG. 7 in accordance with one embodiment.

As shown, write primitive 700 includes a first store operation 702 that stores a data granule to memory. FIG. 9 provides a high-level logical flowchart of an exemplary embodiment of this store operation. In this illustrated embodiment, the store operation illustrated in FIG. 9 begins at block 900 and then proceeds to block 902, which illustrates a core 200 of a host 100 (hereafter, assumed to be host 100a) executing a store instruction that specifies the storage of a granule of data to memory. After any applicable virtual-to-real address translation, core 200 stores the granule of data into its cache hierarchy (e.g., in its L2 cache 230) in association with the target real address, which is assigned to a system memory 108 in the other host 100 (i.e., host 100b). Because hosts 100a, 100b are non-coherent and NC communication link 302 does not transmit coherence messaging between hosts 100a, 100b, mere storage of the data granule into a cache memory of host 100a is insufficient to provide visibility to the hardware threads of host 100b of the association between the data granule and the target real address. Accordingly, the store operation further includes core 200 executing a cache clean instruction to force the data granule to be copied from the cache hierarchy of core 200 to the relevant system memory 108 of host 100b (block 904). Thereafter, the process of FIG. 9 ends at block 906.

Returning to FIG. 7, following store operation 702 in program order, write primitive 700 includes a barrier operation 704 that orders execution of all operations preceding barrier operation 704 in program order prior to execution of all operations following barrier operation 704 in program order. Following barrier operation 704 in program order write primitive 700 includes is a second store operation 706. Store operation 706 updates (e.g., to a value of 1) a flag variable residing in a system memory 108 of either host 100a or host 100b (which may be polled by process executing on host 100b) to indicate that a new data granule has been written to a system memory 108 of host 100b. If the flag resides on host 100b, store operation 706 can be performed as described above with reference to FIG. 9.

Referring now to FIG. 8, there is depicted an exemplary read primitive 800 by which one of host data processing systems 100a, 100b can read data from a system memory 108 of the other host 100a, 100b over a non-coherent communication link 302 in accordance with one embodiment. Read primitive 800 can form part of an instruction sequence of a hypervisor 402, OS 410, or application 412.

Figure 10:
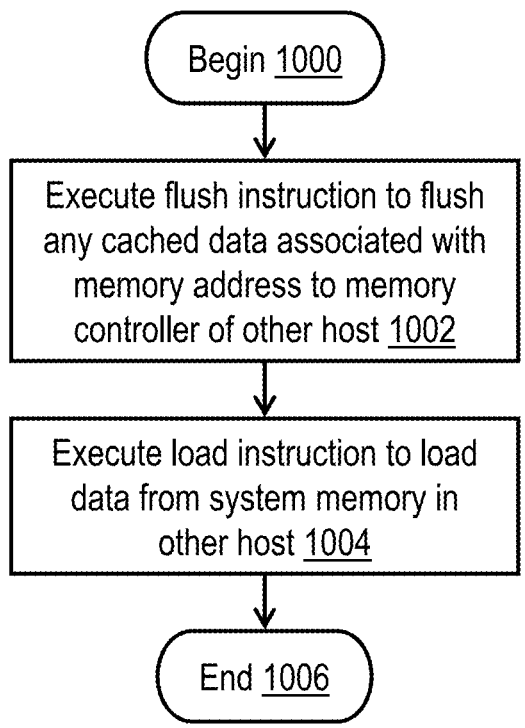
FIG. 10 is a high-level logical flowchart of an exemplary load operation in the read primitive of FIG. 8 in accordance with one embodiment.

As shown, read primitive 800 includes a first load operation 802 that loads a flag from memory. FIG. 10 provides a high-level logical flowchart of an exemplary embodiment of this load operation. In this embodiment, the load operation begins at block 1000 and then proceeds to block 1002, which illustrates a core 200 of a host 100 (hereafter, assumed to be host 100a) executing a flush instruction that specifies that any cached data within host 100a that is associated with the real address of the data granule to be loaded (e.g., the flag) be removed from the cache(s) of host 100a and written back to the relevant memory controller 106 of host 100b. The load operation further includes core 200 thereafter executing a load instruction to load a data granule from the relevant system memory 108 of host 100b (block 1004). Thereafter, the process of FIG. 10 ends at block 1006.

Returning to FIG. 8, following load operation 802, load primitive 800 includes a compare operation 804 that compares the value of the flag loaded from host 100b to a predetermined value (e.g., 1) to determine if the granule of load data is ready to be read. If compare operation 804 determines the value of the flag indicates the granule of load data is ready to be read, conditional branch operation 806 causes execution of load primitive 800 to continue with load operation 810. Load operation 810, which loads a data granule from a system memory 108 of host 100b, can be performed as described above with reference to FIG. 10. If compare operation 804 determines the value of the flag indicate the granule of load data is not ready to be read, branch operation 808 causes execution of load primitive 800 to branch back to load operation 802, which has been described.

It should be appreciated by those skilled in the art that the semaphore communication described above with reference to FIGS. 7-10 is only one of multiple alternative techniques for supporting read and write communication between host data processing systems that are mutually non-coherent.

Figure 11A:
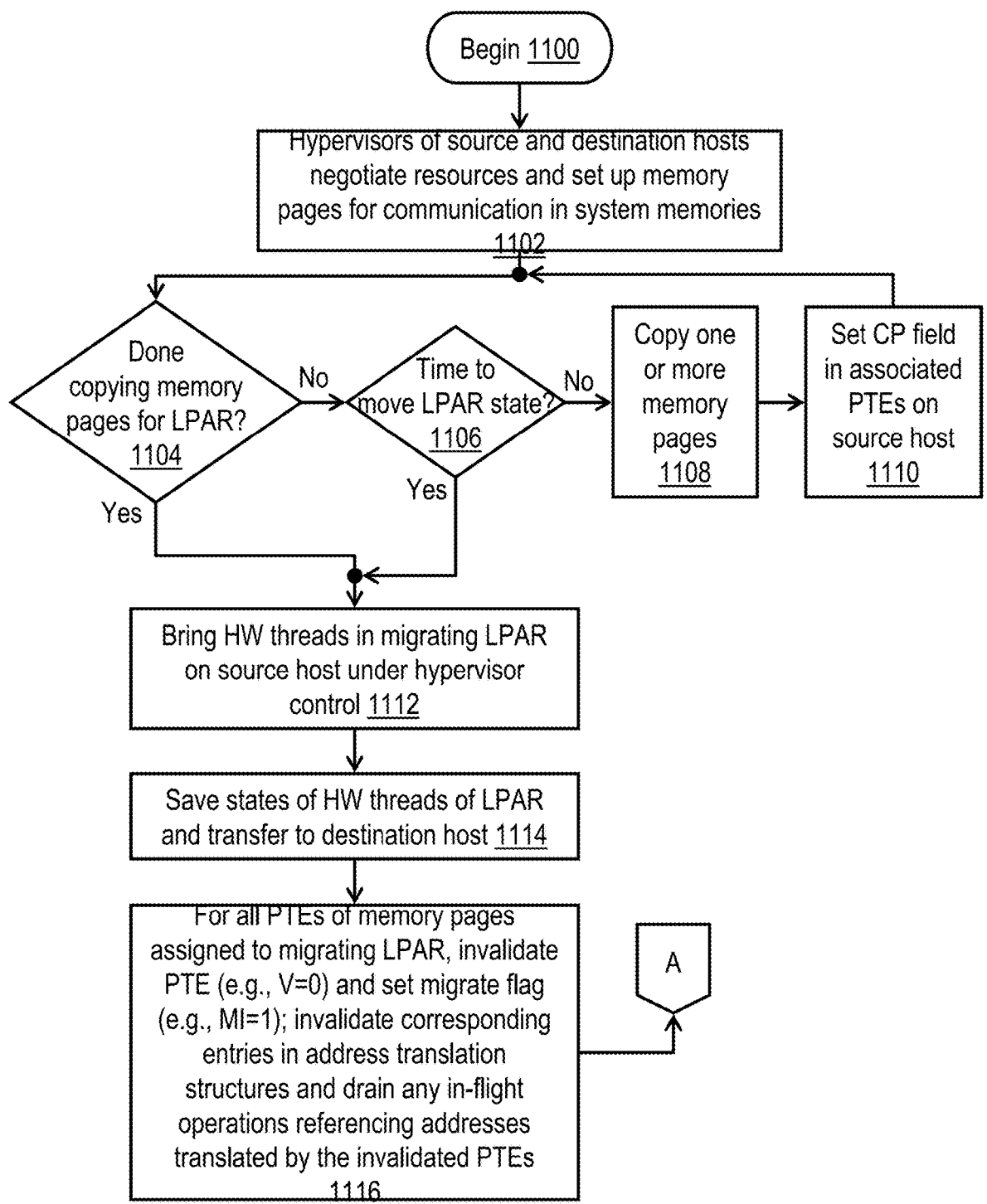
FIGS. 11A-11B together form a high-level logical flowchart of an exemplary method by which a source host migrates a logical partition to a destination host in accordance with one embodiment.
Figure 11B:
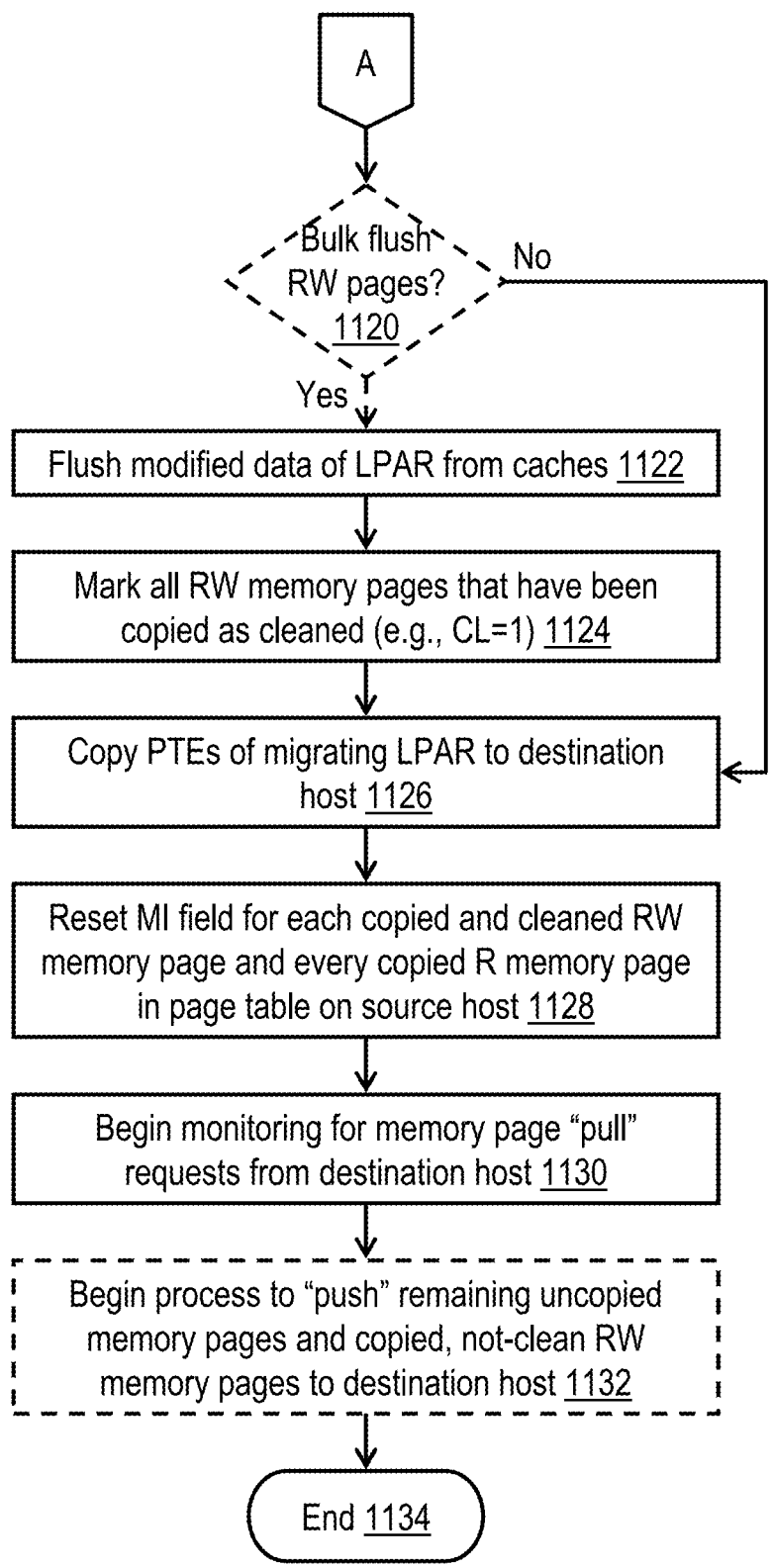

With reference now to FIGS. 11A-11B, there is illustrated a high-level logical flowchart of an exemplary method by which a source host 100 migrates an LPAR 404 from source host 100 to a destination host 100 in accordance with one embodiment. The process begins at block 1100 and then proceeds to block 1102, which illustrates the hypervisors 402 of source and destination hosts 100 (hereafter, assumed to be hosts 100a and 100b, respectively) communicating with each other to negotiate the allocation of the resources (e.g., hardware threads 406, real memory addresses, memory pages 209, etc.) of hosts 100a, 100b to LPARs 404 and to establish certain memory pages 209 for use in communication between hosts 100a, 110b. In at least some embodiments, the hypervisors 402 of the source host 100a and destination host 100b communicate at block 1102 via VIOS 420.

The process proceeds from block 1102 to block 1104, which illustrates the hypervisor 402 of source host 100a determining whether or not it has completed copying all of the memory pages 408 comprising the dataset of the migrating LPAR 404 from host 100a to a system memory 108 in host 100b. If so, the process passes to block 1112, which is described below. If, however, the hypervisor 402 of source host 100a determines at block 1104 that copying of the memory pages 408 comprising the dataset of the migrating LPAR from source host 100a to destination host 100b is not complete, the process continues at block 1106. Block 1106 illustrates hypervisor 402 of source host 100a determining whether to initiate movement of the state of the migrating LPAR 404 from source host 100a to destination host 100b. It should be noted that hypervisor 402 may determine to migrate the state of migrating LPAR 404 before all or some of the dataset is migrated or may wait to migrate the state of the migrating LPAR 404 until all of the dataset of the migrating LPAR 404 has been copied to destination host 100b. As one example, hypervisor 402 may determine at block 1106 to migrate the state of the migrating LPAR 404 after all memory pages 408 in a subset of the memory pages 408 that are the most frequently (or most recently) accessed memory pages 408 have been migrated. In response to an affirmative determination at block 1106, the process passes from block 1106 to block 1112. In response to a negative determination at block 1106, the process proceeds to block 1108.

At block 1108, the hypervisor 402 of source host 100a copies one or more memory pages 408 in the dataset of the migrating LPAR 404 to at least one system memory 108 in destination host 100b. In at least some embodiments, the copying of the memory pages 408 at block 1108 can be performed in accordance with the process described below with reference to FIG. 13. It should be appreciated that the copying of a memory page 408 may require execution of multiple store primitives to a sequence of consecutive real addresses. For example, a memory page 408 may be 4 KB, while the size of an individual data granule copied by the store primitive may be 128 B. In this example, copying of a memory page 408 will require execution of 32 store primitives. For each memory page 408 that is completely copied from source host 100a to destination host 100b, the hypervisor 402 of source host 100a sets the CP field 512 of the associated PTE 212 in system memory 108 of host 100a to indicate that the memory page 408 has been copied to the destination host 100b (block 1110). The process of FIG. 11A returns from block 1110 to block 1104.

At block 1112 and following blocks, the hypervisor 402 of source host 110a copies the state of the migrating LPAR 404 from source host 100a to destination host 100b. Referring specifically to block 1112, the hypervisor 402 of source host 100a brings the hardware threads 406 of the migrating LPAR 404 under its control. In addition, hypervisor 402 saves the state of each hardware thread 406 of the migrating LPAR 404 (e.g., contents of data and control registers related to the hardware thread 406 in the executing core 200) and writes each such hardware thread state of the migrating LPAR 404 to a system memory 108 in destination host 100b. The copying of the state(s) of the hardware thread(s) of the migrating LPAR 404 illustrated at block 1114 can be performed via NC communication link 302 utilizing write primitive 700 as described above with reference to FIGS. 7 and 9. At block 1116, hypervisor 402 of source host 110a also updates each PTE 212 associated with a memory page 408 in the dataset of the migrating LPAR 404 by invalidating the PTE 212 (e.g., resetting valid field 502 to 0) and setting migration (MI) field 516 (e.g., to 1). Block 1116 further illustrates hypervisor 402 invalidating any entries corresponding to the invalidated PTEs 212 in address translation structures 206 of source host 100a and waiting for any and all in-flight operations in source host 100a that reference real addresses translated by the invalidated PTEs to drain from cores 200 of source host 100a. The process then passes through page connector A to block 1120 of FIG. 11B.

As indicated by dashed line illustration, block 1120 is an optional step at which the hypervisor 402 of source host 100a determines whether or not to flush read-write memory pages 408 of the migrating LPAR 404 (i.e., those identified by the RW field 510 of their associated PTEs 212 as read-write memory pages) from the caches of source host 100a. In response to a negative determination at block 1120 or if source host 100 does not support the capability of efficiently flushing the caches of source host 100a, the process passes to block 1126, which is described below. If, however, hypervisor 402 determines at block 1120 to flush the read-write memory pages 408 of the migrating LPAR 404 from the caches of source host 100a, hypervisor 402 executes a procedure to flush all modified data belonging to the dataset of the migrating LPAR 404 from the caches of source host 100a (block 1122). In some embodiments, the eviction depicted at block 1122 can performed by the bulk flushing of all modified data from the caches of source host 100a. It should be noted that, depending on whether or not the underlying memory page 408 has been migrated, the flushing process depicted at block 1122 may entail writing the modified data back to a local system memory 108 of source host 100a or to a system memory 108 of destination host 100b. In addition at block 1124 hypervisor 402 of source host 110a updates the PTEs 212 on source host 110a for all read-write memory pages 408 of the migrating LPAR 404 that have already been migrated to destination host 100b as cleaned (e.g., by setting CL field 514 to 1). Performing a bulk flush of read-write memory pages 408 of the migrating partition 404 as shown at block 1120-1124 provides the advantages of reducing or eliminating the duplicate copying of read-write memory pages 408 and reducing jitter of the migrating LPAR 404 after it begins execution on destination host 100b. In addition, a bulk flush of the read-write memory pages 408 of the migrating LPAR 404 may provide improved performance over solutions that handle the flushing of each read-write memory page 408 of the migrating LPAR 404 individually.

Referring now to block 1126, the hypervisor 402 of source host 100a copies the PTEs 212 that translate addresses in the memory pages 408 of the dataset of the migrating LPAR 404 from source host 100a to destination host 100b. Hypervisor 402 then resets MI field 516 in the PTE 212 of each read-write memory page in the dataset of the migrating LPAR 404 that is identified by PTE fields 512-514 as both copied and cleaned and resets MI field 516 in the PTE 212 of each read-only memory page in the dataset of the migrating LPAR 404 that is identified by PTE field 512 as copied (block 1128). Following block 1128, hypervisor 402 of source host 100a begins monitoring for "pull" requests from the hypervisor 402 of destination host 100b by which destination host 100b initiates the migration of one or more previously un-migrated memory pages 408 in the dataset of the migrating LPAR 404 (block 1130). Exemplary processes by which the hypervisor 402 of destination host 100b "pulls" memory pages in the dataset of the migrating LPAR 404 from source host 100a to the system memory 108 of destination host 100b and by which the hypervisor 402 of source host 100a responds to "pull" requests of destination host 100b are described below with reference to FIGS. 16 and 17, respectively.

As indicated at optional block 1132, the hypervisor 402 of source host 100a may alternatively or additionally initiate a process by which source host 100a "pushes" any remaining un-migrated and migrated, but not clean memory pages 408 in the dataset of the migrating LPAR 404 from source host 100a to system memory 108 in destination host 100b. Exemplary processes by which the hypervisor 402 of source host 100a "pushes" memory pages 408 in the dataset of the migrating LPAR 404 from source host 100a to the system memory 108 of destination host 100b and by which the hypervisor 402 of destination host 100b responds to "push" requests of source host 100a are described below with reference to FIGS. 18 and 19, respectively. Following block 1132 (or following block 1130 if block 1132 is omitted), the process of FIG. 11B ends at block 1134.

Figure 12:
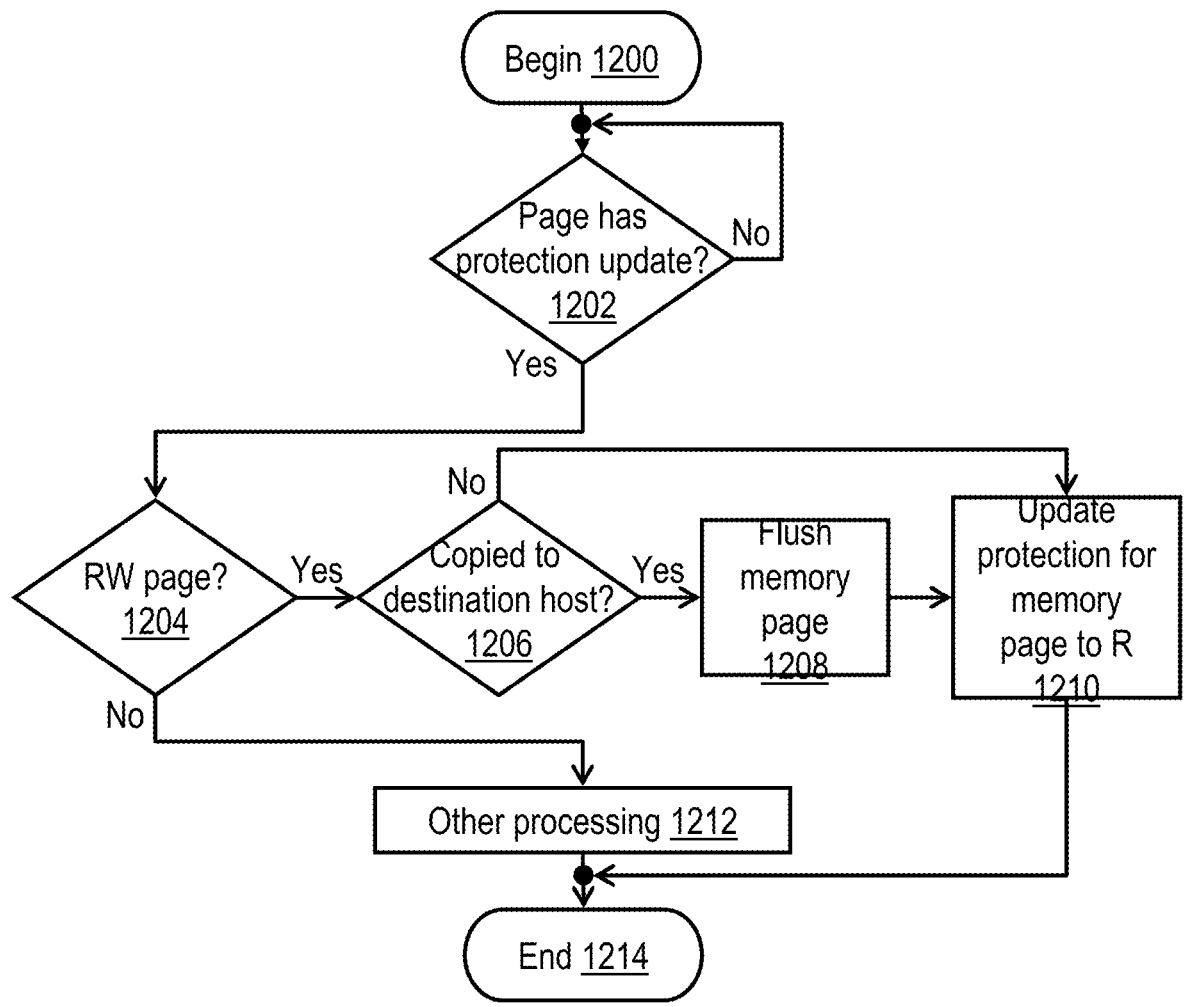
FIG. 12 is a high-level logical flowchart of an exemplary method by which a source host handles a page protection update during migration of a logical partition in accordance with one embodiment.

Referring now to FIG. 12, there is depicted a high-level logical flowchart of an exemplary method by which a source host 100a handles a page protection update during migration of an LPAR 404 in accordance with one embodiment. The process of FIG. 12 begins at block 1200 and then proceeds to block 1202, which illustrates hypervisor 402 of source host 100a determining whether or not a page protection update to a PTE 212 of a memory page 408 of a migrating LPAR 404 is requested. If not, the process iterates at block 1202. If, however, hypervisor 402 determines that a page protection update to a PTE 212 of a memory page 408 of a migrating LPAR 404 is requested, the process proceeds to block 1204.

Block 1204 illustrates hypervisor 402 determining whether or not the PTE 212 to be updated currently indicates the associated memory page 408 is a read-write page (e.g., RW field 510 is set with RW=1). If not (e.g., R field 508 is set R=1 to indicate a read-only memory page), the process passes to block 1212, which illustrates hypervisor 402 performing other processing. Thereafter, the process of FIG. 12 ends at block 1214.

Returning to block 1204, in response to hypervisor 402 determining the PTE 212 to be updated currently indicates the associated memory page 408 is a read-write memory page, hypervisor 402 additionally determines by reference to CP field 512 of the PTE 212 to be updated whether or not the associated memory page 408 has already been migrated to the system memory 108 of destination server 100b. If so, hypervisor 402 executes one or more instructions that cause any modified data for the memory page 408 to be flushed from the caches of source host 100a into system memory 108 of destination host 100b (block 1208) and then updates the page protection information for the memory page 408 from read-write to read-only, for example, by resetting R field 508 and setting RW field 510 (block 1210). By flushing any cached modifications to the date of the memory page 408 for which protection is to be updated, an additional copy of the memory page 408 from source host 100a to destination host 100b can be avoided. If hypervisor 402 determines at block 1206 that the associated memory page 408 has not been migrated to the system memory 108 of destination host, hypervisor 402 simply updates the page protection information as shown at block 1210 without flushing the memory page 408. Following block 1210, the process of FIG. 12 ends at block 1214.

Figure 13:
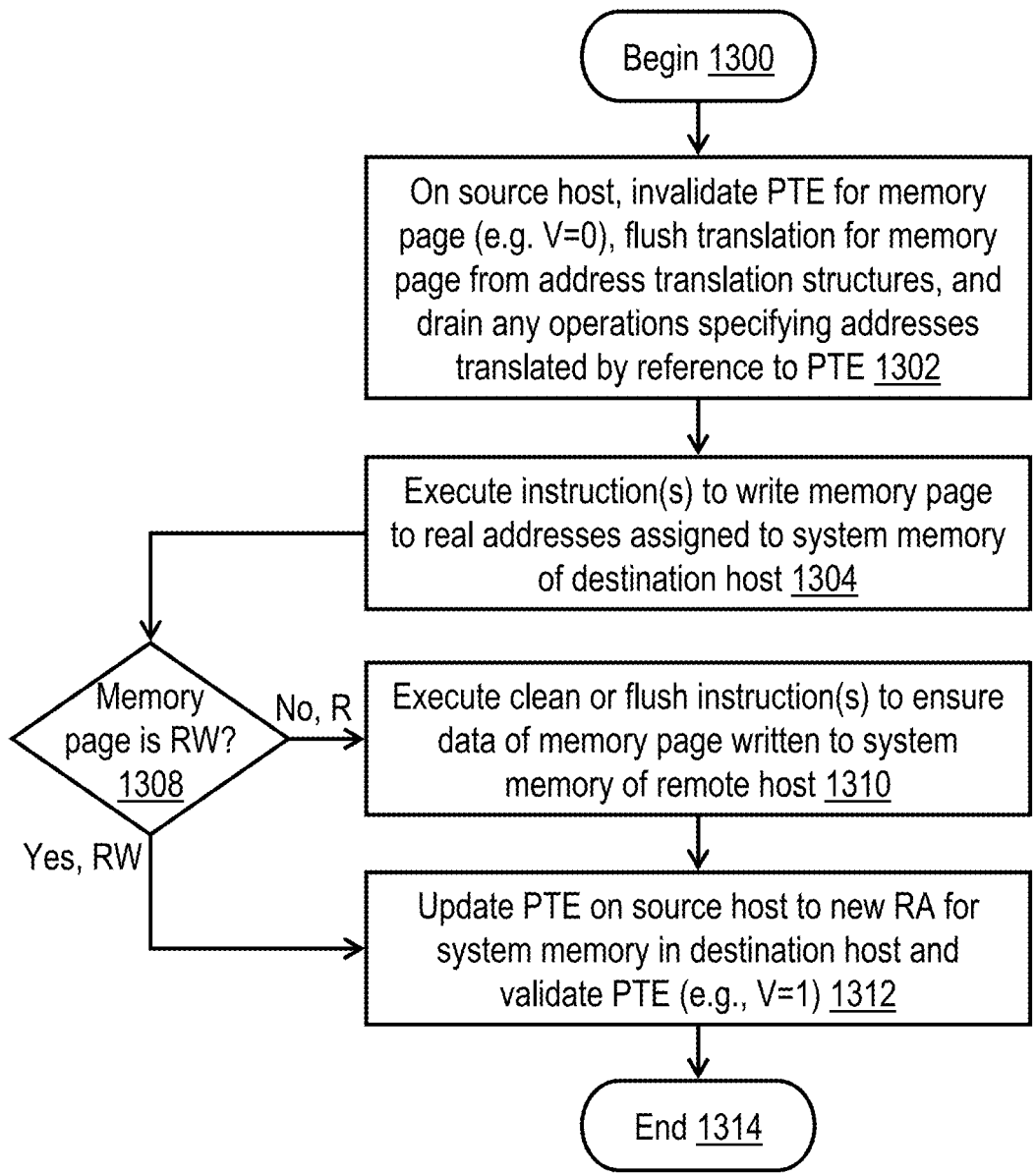
FIG. 13 is a high-level logical flowchart of an exemplary method by which a source host copies memory pages of a logical partition to a destination host in accordance with one embodiment.

With reference now to FIG. 13, there is illustrated a high-level logical flowchart of an exemplary method by which a source host 100a copies a memory page 408 of a migrating LPAR 404 to system memory 108 of a destination host 100b in accordance with one embodiment. In at least some embodiments, the illustrated process may be utilized, for example, to copy one of the memory page(s) 408 copied from source host 100a to destination host 100b at block 1108 of FIG. 11A.

The process of FIG. 13 begins at block 1300 and then proceeds to block 1302, which illustrates hypervisor 402 of source host 100a invalidating the PTE 212 associated with a memory page 408 to be migrated, for example, by resetting valid field 502 to 0. Invalidating PTE 212 makes the PTE 212 temporarily inaccessible for address translations and thus renders the associated memory page 408 accessible only to the hypervisor 402. Block 1302 further illustrates hypervisor 402 invalidating any entries corresponding to the invalidated PTE 212 in address translation structures 206 of source host 100a and waiting for any and all in-flight operations that reference real addresses translated by the invalidated PTE to drain from cores 200 of source host 100a.

Hypervisor 402 then causes instructions to be executed by one or more cores 200 of source host 100a to copy the memory page 408 to real addresses assigned to system memory 108 in destination host 100b (block 1304). As part of this copy process, hypervisor 402 loads the existing image of the memory page 408 from system memory 108 in source host 100a (which resides at a source real address range) and stores the image of the memory page 408 to a destination real address range specifying storage locations in system memory 108 of destination host 100b. As an optimization, some embodiments allocate cache lines corresponding to the destination real address range in the cache memory of source host 100a using data cache block zero (DCBZ), data cache block allocate (DCBA), or similar cache line allocation instructions that create the cache lines (and optionally initialize the newly created cache lines to a predetermined value (e.g., zero)) in the cache memory of source host 100a without fetching the associated data. These cache line allocation instructions can conveniently be implemented in an execution loop that iterates through each cache line in the memory page 408 to be migrated. In such an execution loop, each cache line allocation instruction is preferably constrained to be executed prior to, and in temporal proximity with, the corresponding store instructions that store the data from the existing image of the migrating memory page 408 into the newly allocated cache line. With this execution constraint, there is a high likelihood that the store instructions that update the cache lines in the destination real address range will avoid cache misses and the attendant latency of fetching the cache lines from destination host 100b. In other words, the described optimization has the advantage of avoiding the high latency of fetching a copy of each cache line of data in the destination real address range from destination host 100b only to overwrite the cache line with data from the migrating memory page 408.

At block 1308, hypervisor 402 determines whether or not the memory page 408 is a read-write memory page, for example, by examining RW field 510 of the associated PTE 212. In response to determining at block 1308 that memory page 408 is a read-write memory page, the process passes to block 1312, which is described below. If, however, hypervisor 402 determines memory page 408 is a read-only memory page (e.g., R field 508 is set R=1), hypervisor 402 causes one or more clean or flush instructions to be executed by one or more cores 200 of source host 100a to ensure that data of the read-only memory page 408 is written from the caches of source host 100a to system memory 108 of destination host 100b via NC communication link 302 (block 1310). Following block 1308 or block 1310, the hypervisor 402 of source host 100a updates the real address (RA) specified for the memory page 408 in RA field 506 of the PTE 212 to specify the new real address for the memory page 408 in the system memory 108 of destination host 100b and then updates valid field 502 of the PTE 212 on source host 100a to a valid state (e.g., V=1) to again make PTE 212 accessible for address translation (block 1312). Thereafter, the process of FIG. 13 ends at block 1314.

Figure 14:
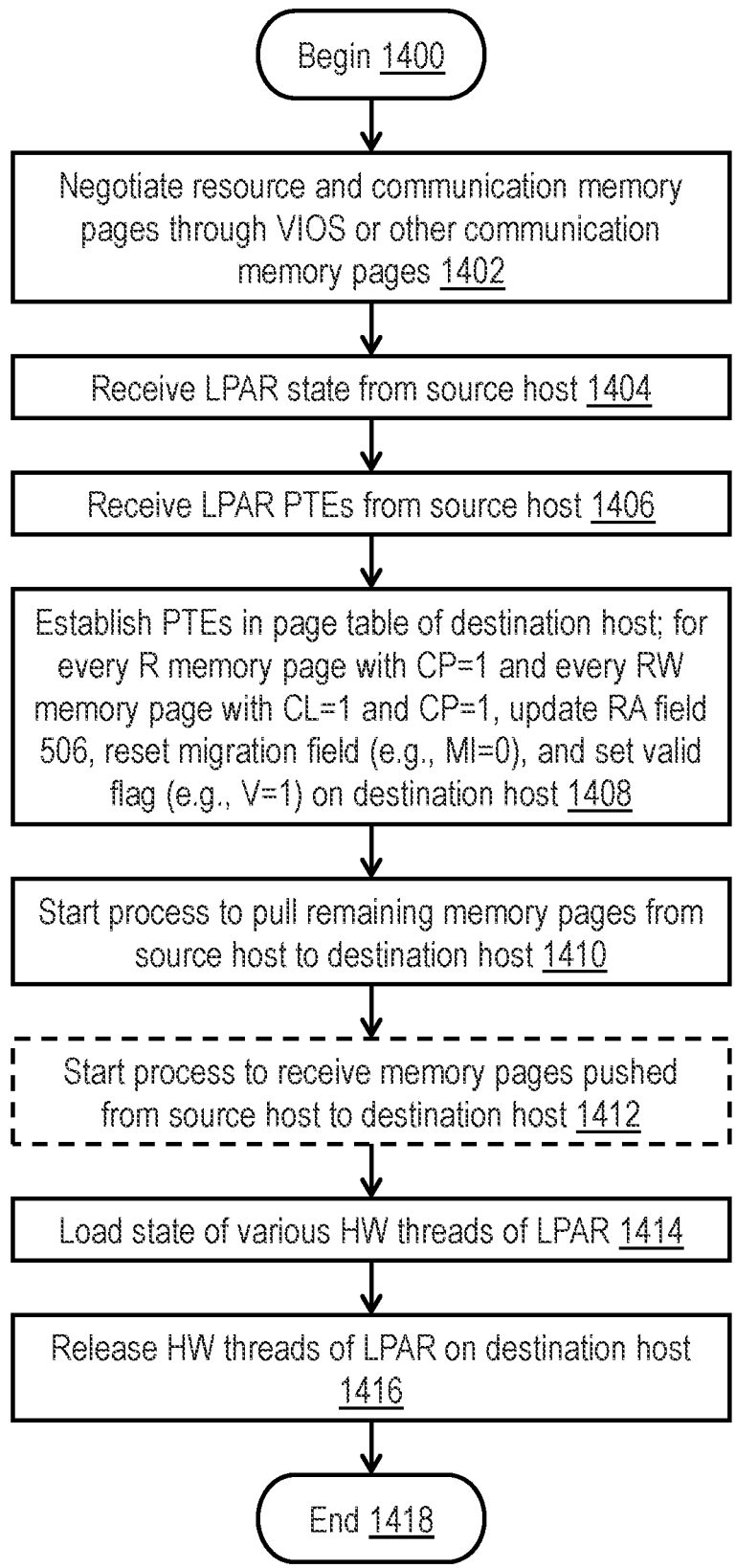
FIG. 14 is a high-level logical flowchart of an exemplary method by which a destination host receives and activates a migrating logical partition in accordance with one embodiment.

Referring now to FIG. 14, there is depicted a high-level logical flowchart of an exemplary method by which a destination host 100b receives and activates a migrating LPAR 404 in accordance with one embodiment. The process of FIG. 14 cooperates with the previously described process of FIGS. 11A-11B performed on source host 100a.

The process of FIG. 14 begins at block 1400 and then proceeds to block 1402, which illustrates the hypervisor 402 of destination hosts 100b communicating with the hypervisor 402 executing on source host 100a to negotiate the allocation of the resources (e.g., hardware threads 406, real memory addresses, memory pages 209, etc.) of hosts 100a, 100b to LPARs 404 and to establish certain memory pages 209 for use in communication between hosts 100a, 110b. In at least some embodiments, the hypervisors 402 of the source host 100a and destination host 100b communicate at block 1402 via VIOS 420.

The process proceeds from block 1402 to block 1404, which illustrates hypervisor 402 of destination host 100b receiving the state of the migrating LPAR 404 from source host 100a via NC communication link 302 and buffering the LPAR state. The LPAR state is transmitted by the source host 100a at block 1114 of FIG. 11A. In addition, at block 1406, hypervisor 402 of destination host 100b receives and buffers the PTEs 212 for the memory pages 408 of the migrating LPAR 404 from source host 100a via NC communication link 302. These PTEs 212 are transmitted by the source host 100a at block 1126 of FIG. 11B.

Block 1408 illustrates the hypervisor 402 of destination host 100b establishing the PTEs 212 associated with the memory pages 408 of the migrating LPAR 404 in the page frame table 210 in system memory 108 of destination server 100b. For each read-only memory page 408 that is indicated by its associated PTE 212 as having already been copied to destination host 100b (e.g., R field 508 is set R=1 and CP field 512 is set CP=1) and for each read-write memory page 408 that is indicated by its associated PTE 212 as having been copied to destination host 100b and cleaned (e.g., RW field 510 is set RW=1 and CL field 514 is set CL=1), hypervisor 402 of destination host 100b updates real address field 506 to reflect the storage location of the memory page 408 in system memory 108 of destination host 100b, resets migration field 516 (e.g., MI=0), and sets valid field 502 (e.g., V=1). Hypervisor 402 of destination host 100b thereby makes these PTEs 212 available for virtual-to-real address translation on destination host 100b.

At block 1410, hypervisor 402 of destination host 100b initiates a process by which hypervisor 402 of destination server 100b "pulls" any remaining un-migrated memory pages 408 of the migrating LPAR 404 from source host 100a to system memory 108 in destination host 100b via NC communication link 302. An exemplary process by which destination host 100b pulls such memory pages 408 from source host 100a is described below with reference to FIG. 16. In addition, at block 1412, hypervisor 402 of destination host 100b optionally initiates a process by which hypervisor 402 of destination server 100b receives any remaining un-migrated memory pages 408 of the migrating LPAR 404 "pushed" from source host 100a to system memory 108 in destination host 100b via NC communication link 302. An exemplary process by which destination host 100b receives such memory pages 408 from source host 100a is described below with reference to FIG. 18. Hypervisor 402 of destination host 100b initiates execution of the migrating LPAR 404 on destination host 100b by loading the state of the various hardware threads 406 of the migrating LPAR 404 to one or more cores 200 of destination host 100b (block 1414) and releasing the hardware threads 406 of the migrating LPAR 404 to begin execution (block 1416). The process of FIG. 14 thereafter ends at block 1416.

Figure 15:
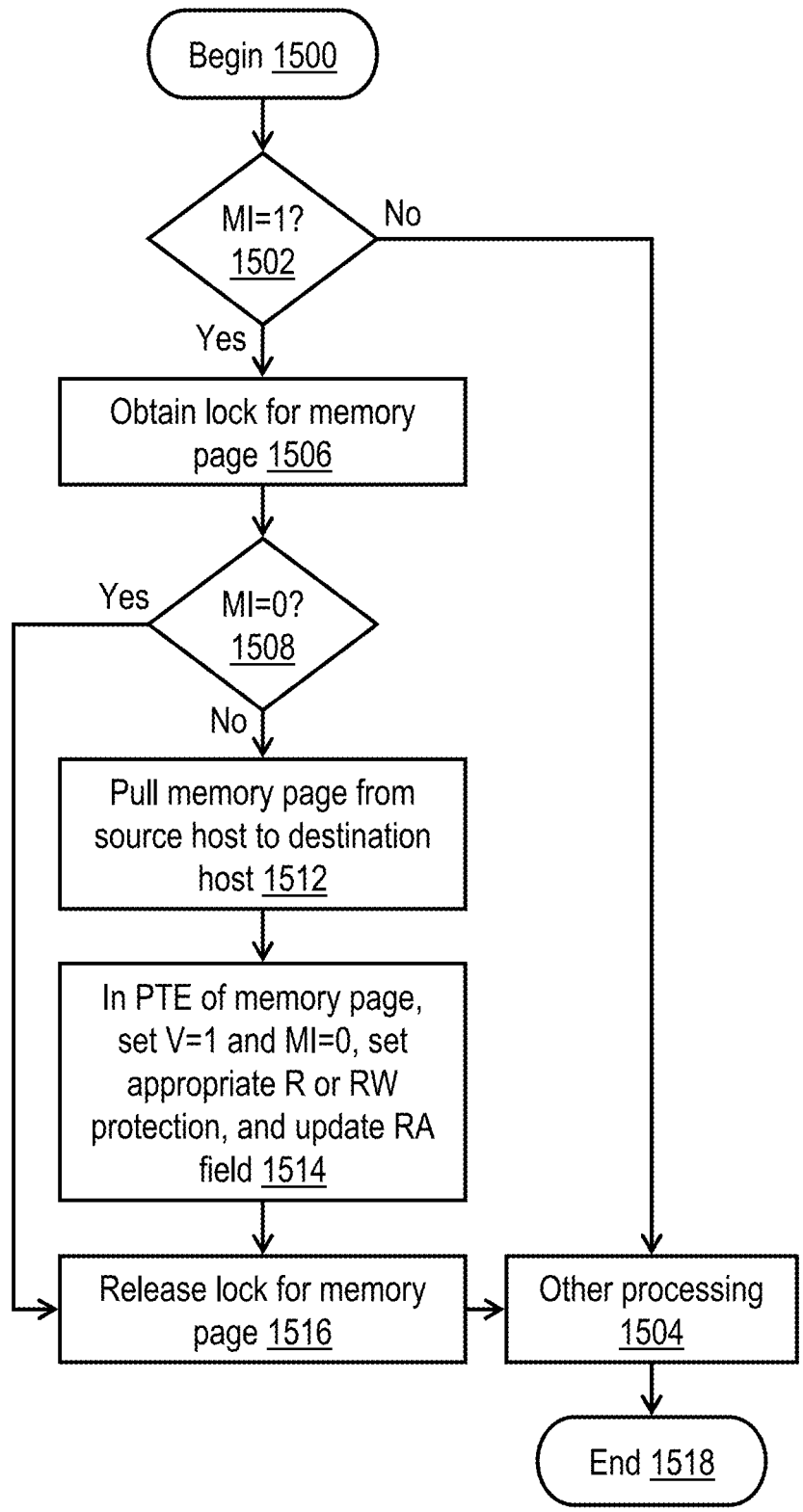
FIG. 15 is a high-level logical flowchart of an exemplary method by which a destination host handles page faults for a migrating logical partition in accordance with one embodiment.

With reference now to FIG. 15, there is illustrated a high-level logical flowchart of an exemplary method by which a destination host 100b handles page faults during migration of a migrating LPAR 404 in accordance with one embodiment. The process of FIG. 15 begins at block 1500 in response to a memory access request of destination host 100b incurring a page fault. In response to the page fault, the process proceeds from block 1500 to block 1502, which illustrates a page fault handler routine executing on destination host 100b determining by reference to the PTE 212 of the memory page 209 containing the target real address of the memory access request whether or not migration field 516 is set (e.g., MI=1) to indicate the memory page 209 is one of the memory pages 408 of a migrating LPAR 404. If not (e.g., MI=0), the page fault handler handles the page fault using other, potentially conventional processing, as depicted at block 1504. Following block 1504, the process of FIG. 15 ends at block 1518.

Referring again to block 1502, in response to a determination that migration field 516 is set, hypervisor 402 of destination host 100b obtains a lock for the memory page 408 on which the page fault occurred (block 1506). Hypervisor 402 of destination host 100b thereafter determines at block 1508 whether or not migration field 516 of the PTE 212 of the memory page 408 was reset during the process of obtaining the lock (e.g., MI=0). If so, the process passes to block 1516, which is described below. If, however, migration field 516 was not reset, hypervisor 402 issues one or more memory access requests to source host 100a via NC communication link 302 in order to pull the memory page 408 from the system memory 108 of source host 100a to the system memory 108 of destination host 100b (block 1512). In the PTE 212 of the memory page 408, hypervisor 402 of destination host 100b sets valid field 502 (V=1), resets migration field 516 (MI=0), sets the appropriate page protection in read field 508 and read-write field 510, and updates real address field 506 with the new real address of the memory page 408 in the system memory 108 of destination host 100b (block 1514). Following block 1514, hypervisor 402 of destination host 100b releases the lock for the memory page 408 (block 1516). Thereafter, the process passes to block 1504, which illustrates the page fault handler completing handling of the page fault with other, potentially conventionally processing. The process of FIG. 15 thereafter ends at block 1518.

Figure 16:
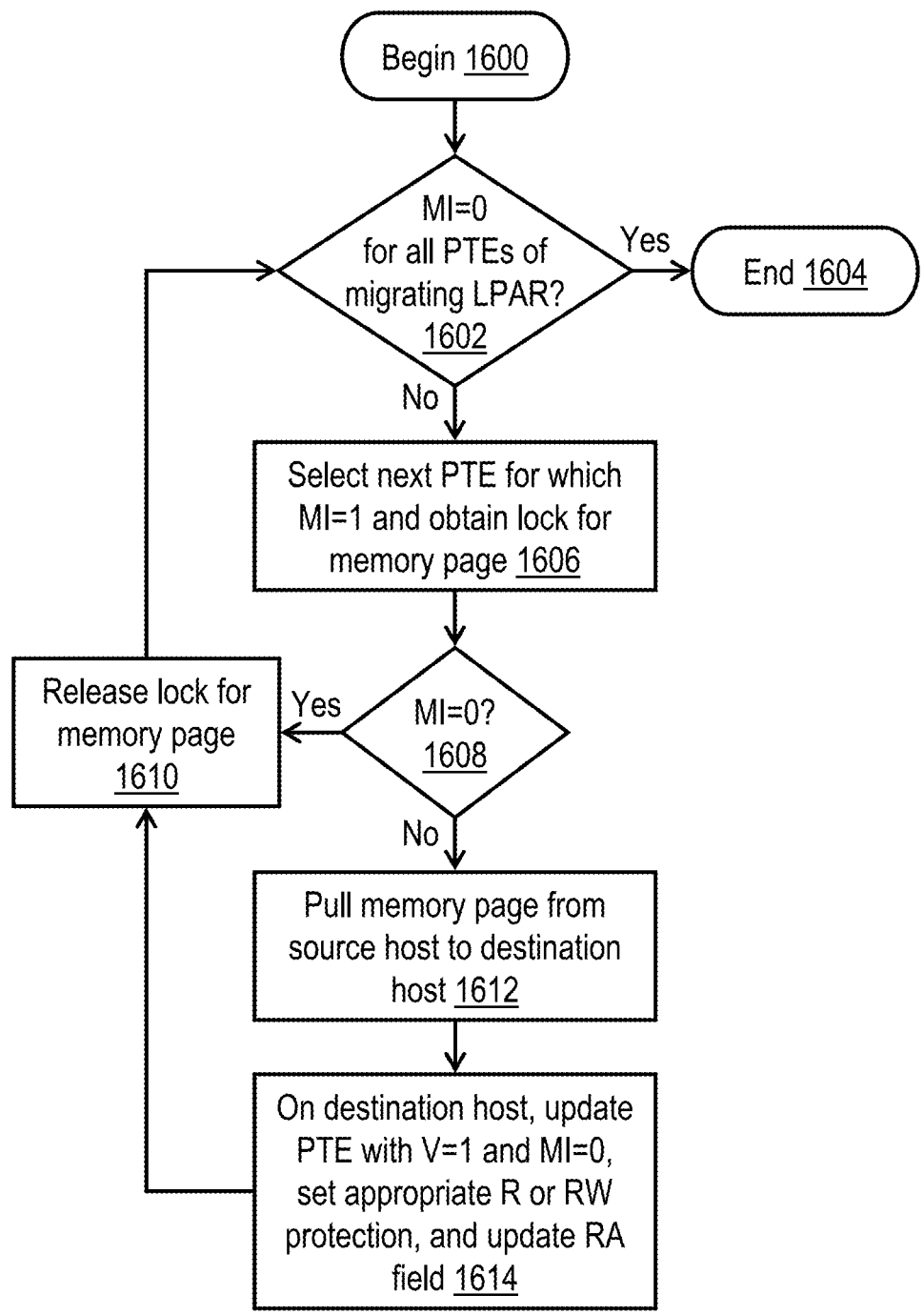
FIG. 16 is a high-level logical flowchart of an exemplary method by which a destination host "pulls" memory pages of a migrating logical partition from a source host in accordance with one embodiment.

Referring now to FIG. 16 is a high-level logical flowchart of an exemplary method by which a destination host 100b "pulls" memory pages of a migrating LPAR 404 from a source host 100a in accordance with one embodiment. This process can be performed, for example, at block 1410 of FIG. 14.

The process of FIG. 16 begins at block 1600 and thereafter proceeds to block 1602, which illustrates hypervisor 402 of destination host 100b determining whether or not migration field 516 is reset (e.g., MI=0) in the PTEs 212 of all memory pages 408 of the migrating LPAR 404. If so, the migration of the dataset of the migrating LPAR 404 from the source host 100a to destination host 100b is complete. Accordingly, the process of FIG. 16 ends at block 1604.

If, however, hypervisor 402 of destination host 100b determines at block 1602 that at least one memory page 408 remains to be migrated to destination host 100b, hypervisor 402 of destination host 100b selects one of un-migrated memory pages 408 in the dataset of the migrating LPAR 404 (as indicated by the migration field 516 of its PTE 212 being set) and obtains a lock for the memory page 408 (block 1606). Hypervisor 402 of destination host 100b thereafter determines at block 1608 whether or not migration field 516 of the PTE 212 of the selected memory page 408 was reset (e.g., MI=0) during the process of obtaining the lock. If so, the process passes to block 1610, which is described below. If, however, migration field 516 has not been reset, hypervisor 402 issues one or more memory access requests to source host 100a via NC communication link 302 in order to pull the memory page 408 from the system memory 108 of source host 100a to the system memory 108 of destination host 100b (block 1612). In the PTE 212 for the memory page 408 on destination host 100b, hypervisor 402 of destination host 100b sets valid field 502 (e.g., V=1), resets migration field 516 (e.g., MI=0), sets the appropriate page protection for the memory page 408 in read field 508 and read-write field 510, and updates real address field 506 with the new real address of the memory page 408 in the system memory 108 of destination host 100b (block 1614). Following block 1614, hypervisor 402 of destination host 100b releases the lock for the memory page 408 (block 1610). Thereafter, the process of FIG. 16 returns to block 1602, which has been described.

Figure 17:
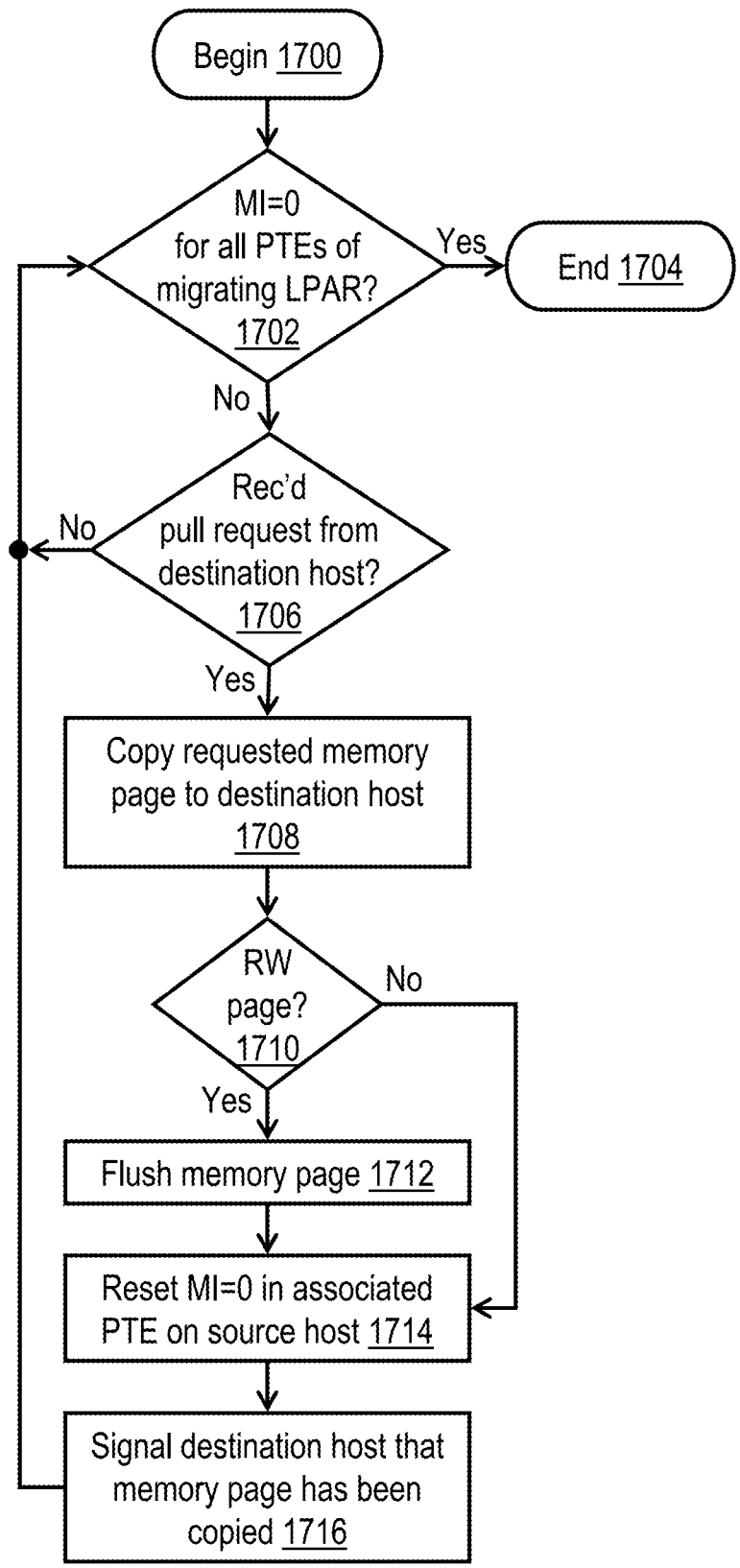
FIG. 17 is a high-level logical flowchart of an exemplary method by which a source host processes "pull" requests for memory pages of a migrating logical partition from a destination host in accordance with one embodiment.

With reference now to FIG. 17, there is illustrated a high-level logical flowchart of an exemplary method by which a source host 100a processes pull requests for memory pages 408 of a migrating LPAR 408 from a destination host 100b in accordance with one embodiment. The illustrated process can be performed, for example, at block 1130 of FIG. 11B.

The process of FIG. 17 begins at block 1700 and thereafter proceeds to block 1702, which illustrates hypervisor 402 of source host 100a determining whether or not migration field 516 is reset (e.g., MI=0) in the PTEs 212 on source host 100a for all memory pages 408 in the dataset of the migrating LPAR 404. If so, the migration of the dataset of the migrating LPAR 404 from the source host 100a to destination host 100b is complete. Accordingly, the process of FIG. 17 ends at block 1704.

If, however, hypervisor 402 of source host 100a determines at block 1702 that at least one memory page 408 remains to be migrated from source host 100a to destination host 100b, hypervisor 402 of source host 100a determines at block 1706 whether or not a pull request for a memory page 408 in the dataset of the migrating LPAR 404 has been received from destination host 100b via NC communication link 302. If not, the process of FIG. 17 returns to block 1702, which has been described. If, however, a pull request for a memory page 408 in the dataset of the migrating LPAR 404 has been received, hypervisor 402 of source host 100a responds to the pull request of destination host 100b by transmitting the requested memory page 408 to the system memory 108 of destination host 100b via NC communication link 302 (block 1708).

At block 1710, hypervisor 402 of source host 100a determines whether or not the memory page 408 migrated at block 1708 is identified as a read-write memory page in the read-write field 510 of the associated PTE 212 on source host 100a. If not (e.g., RW=0), the process proceeds to block 1714, which is described below. If, however, read-write field 510 of the PTE 212 for the memory page 408 is set to indicate a read-write page (e.g., RW=1), hypervisor 402 of source host 100a flushes all granules of the memory page 408 from the caches of source host 100a (block 1712). Source host 100a additionally resets the migration field 516 (e.g., MI=0) in the PTE 212 of the memory page 408 in the system memory 108 of source host 100a (block 1714). Following block 1714, hypervisor 402 of source host 100a signals destination host 100b that the memory page 408 has been migrated to the system memory 108 of destination host 100*b*, for example, by setting a flag (block 1716). Thereafter, the process of FIG. 17 returns to block 1702, which has been described.

Figure 18:
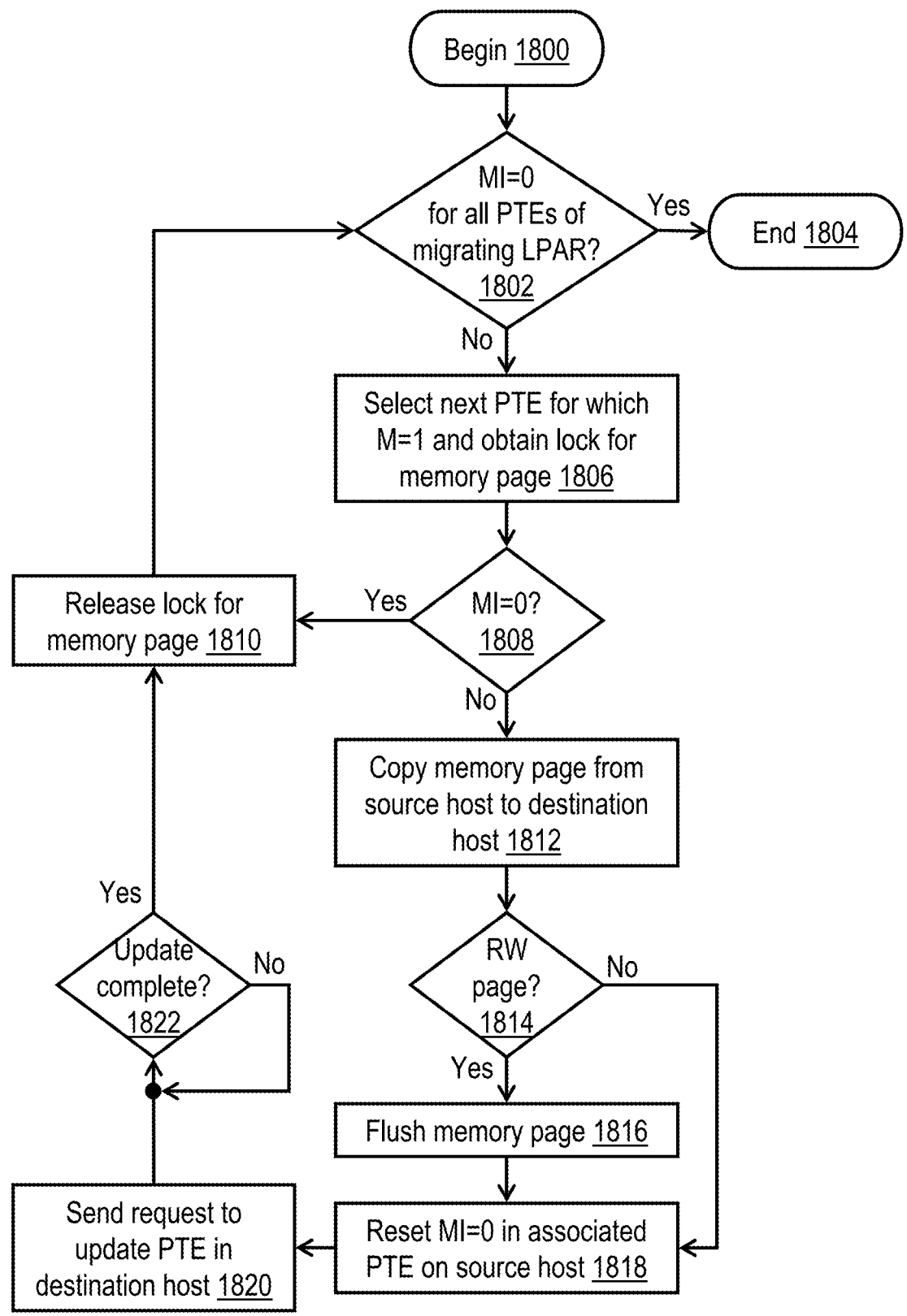
FIG. 18 is a high-level logical flowchart of an exemplary method by which a source host "pushes" memory pages of a migrating logical partition to a destination host in accordance with one embodiment.

Referring now to FIG. 18, there is depicted a high-level logical flowchart of an exemplary method by which a source host 100*a* "pushes" memory pages 408 of a migrating LPAR 404 to a destination host 100*b* in accordance with one embodiment. This process can be performed, for example, at block 1132 of FIG. 11B.

The process of FIG. 18 begins at block 1800 and thereafter proceeds to block 1802, which illustrates hypervisor 402 of source host 100*a* determining whether or not migration field 516 is reset (e.g., MI=0) in the PTEs 212 of all memory pages 408 of the migrating LPAR 404 on source host 1004*a*. If so, the migration of the dataset of the migrating LPAR 404 from the source host 100*a* to destination host 100*b* is complete. Accordingly, the process of FIG. 18 ends at block 1804.

If, however, hypervisor 402 of source host 100*a* determines at block 1802 that at least one memory page 408 remains to be migrated to destination host 100*b*, hypervisor 402 of source host 100*a* selects one of un-migrated memory pages 408 in the dataset of the migrating LPAR 404 (as indicated by the migration field 516 of its PTE 212 being set) and obtains a lock for the memory page 408 (block 1806). Hypervisor 402 of source host 100*a* thereafter determines at block 1808 whether or not migration field 516 of the PTE 212 of the selected memory page 408 has been reset while the lock was obtained (e.g., MI=0). If so, the process passes to block 1810, which is described below. If, however, migration field 516 has not been reset, hypervisor 402 of source host 100*a* issues one or more memory access requests to destination host 100*b* via NC communication link 302 in order to push the memory page 408 from the system memory 108 of source host 100*a* to the system memory 108 of destination host 100*b* (block 1812).

At block 1814, hypervisor 402 of source host 100*a* determines whether or not the memory page 408 migrated at block 1812 is identified as a read-write memory page in the read-write field 510 of the associated PTE 212 in the page frame table 210 in the system memory 108 of source host 100*a*. If not (e.g., RW=0), the process proceeds to block 1818, which is described below. If, however, read-write field 510 of the PTE 212 for the memory page 408 is set to indicate a read-write page (e.g., RW=1), hypervisor 402 of source host 100*a* flushes all granules of the memory page 408 from the caches of source host 100*a* to the system memory 108 of destination host 100*b* (block 1816). Source host 100*a* additionally resets the migration field 516 (e.g., MI=0) in the PTE 212 of the memory page 408 in the system memory 108 of source host 100*a* (block 1818).

At block 1820, hypervisor 402 of source host 100*a* sends via NC communication link 302 a request for destination host 100*b* to update the PTE 212 for the memory page 408 on destination host 100*b*. In response to the PTE update request, hypervisor 402 of destination host 100*b* sets valid field 502 (e.g., V=1), resets migration field 516 (e.g., MI=0), and updates real address field 506 with the new real address of the memory page 408 in the system memory 108 of destination host 100*b*. Following block 1820, hypervisor 402 of source host 100*a* monitors for a confirmation message from destination host 100*b* via NC communication link 302 confirming update of the PTE 212 (block 1822). In response to receipt of the confirmation message, source host 100*a* releases the lock for the memory page 408 (block 1810). Thereafter, the process of FIG. 18 returns to block 1802, which has been described.

Figure 19:
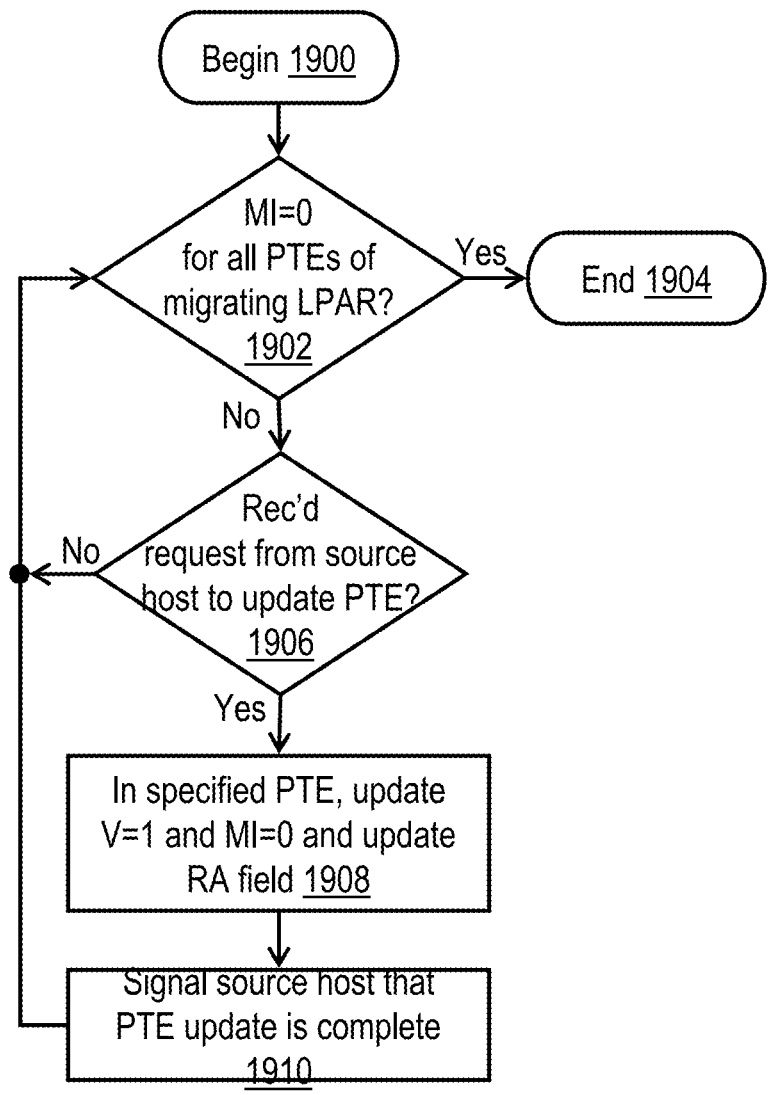
FIG. 19 is a high-level logical flowchart of an exemplary method by which a destination host processes "push" requests for memory pages of a migrating logical partition from a source host in accordance with one embodiment.

With reference now to FIG. 19, there is illustrated a high-level logical flowchart of an exemplary method by which a destination host 100*b* processes push requests for memory pages 408 of a migrating LPAR 404 received from a source host 100*a* in accordance with one embodiment. The illustrated process can be performed, for example, at block 1412 of FIG. 14.

The process of FIG. 19 begins at block 1900 and thereafter proceeds to block 1902, which illustrates hypervisor 402 of destination host 100*b* determining whether or not migration field 516 is reset (e.g., MI=0) in the PTEs 212 on source host 100*a* for all memory pages 408 in the dataset of the migrating LPAR 404. If so, the migration of the dataset of the migrating LPAR 404 from the source host 100*a* to destination host 100*b* is complete. Accordingly, the process of FIG. 19 ends at block 1904.

If, however, hypervisor 402 of destination host 100*b* determines at block 1902 that at least one memory page 408 remains to be migrated from source host 100*a* to destination host 100*b*, hypervisor 402 of destination host 100*b* determines at block 1906 whether or not it has received from source host 100*a*, via NC communication link 302, a PTE update request that requests an update to the PTE 212 of a memory page 408 in the dataset of the migrating LPAR 404. If not, the process of FIG. 19 returns to block 1902, which has been described. If, however, a PTE update request has been received, hypervisor 402 of destination host 100*b* responds to the PTE update request by setting valid field 502 (e.g., V=1), resetting migration field 516 (e.g., MI=0), and updating the real address field 506 with the new real address of the memory page 408 in the system memory 108 of destination host 100*b* (block 1908). Hypervisor 402 of destination host 100*b* sends a confirmation message to source host 100*a* confirming update of the PTE 212 (block 1910). Thereafter, the process of FIG. 19 returns to block 1902, which has been described.

Figure 20:
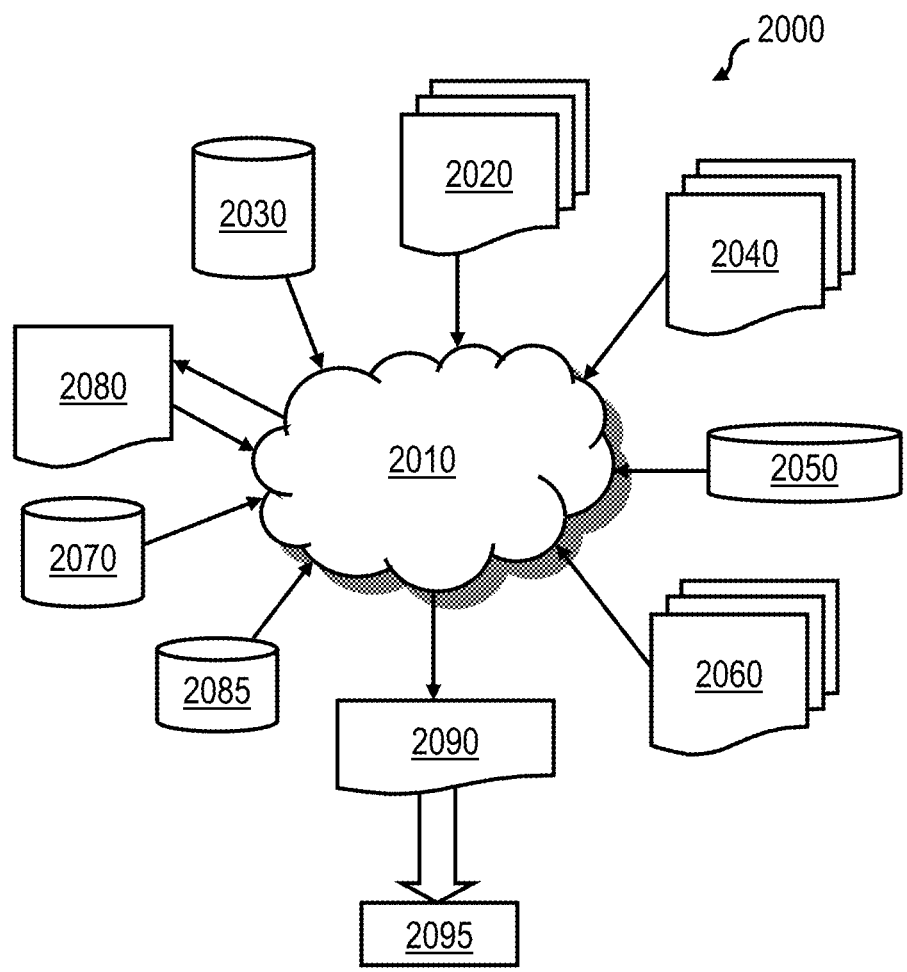
FIG. 20 is a data flow diagram illustrating a design process in accordance with one embodiment.

With reference now to FIG. 20, there is depicted a block diagram of an exemplary design flow 2000 used for example, in semiconductor IC logic design, simulation, test, layout, and manufacture. Design flow 2000 includes processes, machines and/or mechanisms for processing design structures or devices to generate logically or otherwise functionally equivalent representations of the design structures and/or devices described herein. The design structures processed and/or generated by design flow 2000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 2000 may vary depending on the type of representation being designed. For example, a design flow 2000 for building an application specific IC (ASIC) may differ from a design flow 2000 for designing a standard component or from a design flow 2000 for instantiating the design into a programmable array, for example a programmable gate array (PGA) or a field programmable gate array (FPGA) offered by Altera® Inc. or Xilinx® Inc.

FIG. 20 illustrates multiple such design structures including an input design structure 2020 that is preferably processed by a design process 2010. Design structure 2020 may be a logical simulation design structure generated and processed by design process 2010 to produce a logically equivalent functional representation of a hardware device. Design structure 2020 may also or alternatively comprise data and/or program instructions that when processed by design process 2010, generate a functional representation of the physical structure of a hardware device. Whether representing functional and/or structural design features, design structure 2020 may be generated using electronic computer-aided design (ECAD) such as implemented by a core developer/designer. When encoded on a machine-readable data transmission, gate array, or storage medium, design structure 2020 may be accessed and processed by one or more hardware and/or software modules within design process 2010 to simulate or otherwise functionally represent an electronic component, circuit, electronic or logic module, apparatus, device, or system such as those shown herein. As such, design structure 2020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 2010 preferably employs and incorporates hardware and/or software modules for synthesizing, translating, or otherwise processing a design/simulation functional equivalent of the components, circuits, devices, or logic structures shown herein to generate a netlist 2080 which may contain design structures such as design structure 2020. Netlist 2080 may comprise, for example, compiled or otherwise processed data structures representing a list of wires, discrete components, logic gates, control circuits, I/O devices, models, etc. that describes the connections to other elements and circuits in an integrated circuit design. Netlist 2080 may be synthesized using an iterative process in which netlist 2080 is resynthesized one or more times depending on design specifications and parameters for the device. As with other design structure types described herein, netlist 2080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 2010 may include hardware and software modules for processing a variety of input data structure types including netlist 2080. Such data structure types may reside, for example, within library elements 2030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 2040, characterization data 2050, verification data 2060, design rules 2070, and test data files 2085 which may include input test patterns, output test results, and other testing information. Design process 2010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 2010 without deviating from the scope and spirit of the invention. Design process 2010 may also include modules for performing standard circuit design processes such as timing analysis, verification, design rule checking, place and route operations, etc.

Design process 2010 employs and incorporates logic and physical design tools such as HDL compilers and simulation model build tools to process design structure 2020 together with some or all of the depicted supporting data structures along with any additional mechanical design or data (if applicable), to generate a second design structure 2090. Design structure 2090 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 2020, design structure 2090 preferably comprises one or more files, data structures, or other computer-encoded data or instructions that reside on transmission or data storage media and that when processed by an ECAD system generate a logically or otherwise functionally equivalent form of one or more of the embodiments of the invention. In one embodiment, design structure 2090 may comprise a compiled, executable HDL simulation model that functionally simulates the devices shown herein.

Design structure 2090 may also employ a data format used for the exchange of layout data of integrated circuits and/or symbolic data format (e.g., information stored in a GDSII (GDS2), GL1, OASIS, map files, or any other suitable format for storing such design data structures). Design structure 2090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 2090 may then proceed to a stage 2095 where, for example, design structure 2090: proceeds to tape-out, is released to manufacturing, is released to a mask house, is sent to another design house, is sent back to the customer, etc.

As has been described, in at least one embodiment, a data processing system that serves a source host from which a logical partition is migrated can include a system fabric, a system memory, a memory controller of the system memory that is communicatively coupled to the system fabric, and a link controller communicatively coupled to the system fabric and configured to be communicatively coupled via a communication link to a destination host with which the source host is non-coherent. The source host additionally includes a plurality of processing units communicatively coupled to the system fabric. The plurality of processing units is configured, for example, by a hypervisor or virtual machine monitor, to execute a logical partition having a dataset residing in the system memory and to migrate the logical partition to the destination host via the communication link. Migration of the logical partition includes migrating, via a communication link, the dataset of the logical partition executing on the source host from the system memory of the source host to a system memory of the destination host. After migrating at least a portion of the dataset, a state of the logical partition is migrated, via the communication link, from the source host to the destination host, such that the logical partition thereafter executes on the destination host. This migration technique provides reduced latency for the migration and improved jitter for the logical partition.

In the previously described examples, the source host specifies the storage locations in the system memory of the destination host to which memory pages are to be copied utilizing real addresses. Those skilled in the art will appreciate that in other examples the storage locations in the system memory of the destination host may alternatively be specified utilizing effective or virtual addresses that are subject to one or more layers of address translation to obtain real addresses in the real address space of the destination host.

While various embodiments have been particularly shown and described, it will be understood by those skilled in the art that various changes in form and detail may be made therein without departing from the scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing environment including physical first and second data processing systems, wherein the first data processing system is a source host and the second data processing system is a destination host, the method comprising:
    executing on one or more physical processor cores of the source host one or more hardware threads of execution of a logical partition, wherein each hardware thread among the one or more hardware threads has a respective thread state including contents of registers in a physical processor core executing said each hardware thread;
    the source host coordinating migration of the logical partition from the source host to the destination host utilizing communication via a network connection;
    performing a live migration, via a physical link controller in the source host and a physical communication link coupling the source host and destination host, of a dataset of the logical partition while one or more hardware threads of the logical partition are executing on the source host from a system memory of the source host to a system memory of the destination host, wherein the source host is a separate physical data processing system from the destination host and is non-coherent with respect to the destination host, and wherein performing the live migration includes refraining from using the network connection to migrate the dataset from the source host to the destination host;
    after migrating at least a portion of the dataset, migrating, from the source host to the destination host via the link controller and the communication link, a state of the logical partition, wherein the state of the logical partition includes a respective thread state of each of the one or more hardware threads of the logical partition; and
    after migrating the state of the logical partition to the destination host, executing the one or more threads of the logical partition on the destination host.

2. The method of claim 1, wherein performing live migration of the dataset includes migrating at least some of the dataset of the logical partition from the source host to the destination host after execution of the one or more hardware threads of the logical partition begins on the destination host.

3. The method of claim 1, wherein performing live migration of the dataset includes the source host copying one or more memory pages of the dataset from system memory in the source host to system memory in the destination host based on requests of the destination host.

4. The method of claim 1, wherein performing live migration of the dataset includes the source host initiating copying of one or more memory pages of the dataset from system memory in the source host to system memory in the destination host.

5. The method of claim 1, wherein:
    the dataset includes a plurality of memory pages, each having a respective associated page table entry defining a virtual-to-real address translation for the associated memory page; and the method further comprises the source host tracking in a data structure which page table entries for the plurality of memory pages have been migrated to the destination host.

6. The method of claim 1, wherein:
the source host includes a physical system fabric and a physical link controller physically and communicatively coupled to the system fabric; and
performing live migration of the dataset includes:
the source host issuing, on the physical system fabric, a store request specifying an address in a system memory of the destination host; and
the physical link controller in the source host receiving the store request on the system fabric and, based on the address, transmitting the store request via the communication link to a memory controller within the destination host.

7. The method of claim 1, wherein performing live migration of the dataset includes the source host performing a bulk flush of all memory pages in the dataset that are subject to update by the source host from the caches of the source host to system memory.

8. A data processing system that is a source host, the data processing system comprising:
a physical system fabric;
a system memory;
a memory controller of the system memory, wherein the memory controller is physically and communicatively coupled to the system fabric and to the system memory;
a physical link controller physically and communicatively coupled to the system fabric and configured to be physically and communicatively coupled, via a communication link, to a destination host that is a separate physical data processing system from the source host, wherein the source host is non-coherent with respect to the destination host; and
a plurality of physical processor cores communicatively coupled to the system fabric, wherein each physical processor core among the plurality of physical processor cores processes one or more hardware threads of execution each having a respective thread state including contents of registers in that physical processor core, wherein the plurality of physical processor cores is configured to execute one or more hardware threads of a logical partition having a dataset residing in the system memory, and wherein the plurality of physical processor cores is configured to perform live migration, to the destination host via the link controller and the communication link, of the logical partition while the one or more hardware threads of the logical partition are executing on the source host by:
coordinating migration of the logical partition from the source host to the destination host utilizing communication via a network connection;
migrating, from the system memory of the source host to a system memory of the destination host via the link controller and the communication link, the dataset of the logical partition while the one or more threads of the logical partition are executing on the source host, wherein migrating the dataset includes refraining from using the network connection to migrate the dataset;
after migrating at least a portion of the dataset, migrating, via the link controller and the communication link, a state of the logical partition from the source host to the destination host, such that the one or more hardware threads of the logical partition thereafter execute on the destination host, wherein the state of the logical partition includes a respective thread state of each of the one or more hardware threads of the logical partition.

9. The data processing system of claim 8, wherein migrating the dataset includes migrating at least some of the dataset of the logical partition from the source host to the destination host after execution of the one or more hardware threads of the logical partition begins on the destination host.

10. The data processing system of claim 8, wherein migrating the dataset includes the source host copying one or more memory pages of the dataset from system memory in the source host to system memory in the destination host based on requests of the destination host.

11. The data processing system of claim 8, wherein migrating the dataset includes the source host initiating copying of one or more memory pages of the dataset from system memory in the source host to system memory in the destination host.

12. The data processing system of claim 8, wherein:
the dataset includes a plurality of memory pages, each having a respective associated page table entry defining a virtual-to-real address translation for the associated memory page; and
the plurality of physical processor cores is further configured to perform:
tracking in a data structure which page table entries for the plurality of memory pages have been migrated to the destination host.

13. The data processing system of claim 8, wherein migrating the dataset includes:
the source host issuing on the system fabric of the source host a store request specifying an address in a system memory of the destination host; and
the link controller of the source host receiving the store request and, based on the address, transmitting the store request via the communication link to a memory controller within the destination host.

14. The data processing system of claim 8, wherein migrating the dataset includes the source host performing a bulk flush of all memory pages in the dataset that are subject to update by the source host from the caches of the source host to system memory.

15. A program product, comprising:
a computer-readable storage device; and
program code, stored within the computer-readable storage device, which when executed by a physical first data processing system serving as a source host causes the first data processing system to perform live migration of a logical partition to a physical second data processing system serving as a destination host, wherein live migration of the logical partition includes:
executing on one or more physical processor cores of the source host one or more hardware threads of execution of the logical partition, wherein each hardware thread among the one or more hardware threads has a respective thread state;
coordinating migration of the logical partition from the source host to the destination host utilizing communication via a network connection;
performing a live migration, from a system memory of the source host to a system memory of the destination host via a physical link controller in the source host and a physical communication link coupling the source host and destination host, of a dataset of the logical partition while the one or more hardware threads of the logical partition are executing on the source host, wherein the source host is a separate physical data processing system from the destination host and is non-coherent with respect to the destination host, and wherein performing the live migration includes refraining from using the network connection to migrate the dataset from the source host to the destination host;

after migrating at least a portion of the dataset, migrating, from the source host to the destination host via the link controller and communication link, a state of the logical partition, wherein the state of the logical partition includes a respective thread state of each of the one or more hardware threads of the logical partition; and after migrating the state of the logical partition to the destination host, executing the one or more hardware threads of the logical partition on the destination host.

16. The program product of claim 15, wherein performing live migration of the dataset includes migrating at least some of the dataset of the logical partition from the source host to the destination host after execution of the one or more hardware threads of the logical partition begins on the destination host.

17. The program product of claim 15, wherein performing live migration of the dataset includes the source host copying one or more memory pages of the dataset from system memory in the source host to system memory in the destination host based on requests of the destination host.

18. The program product of claim 15, wherein performing live migration of the dataset includes the source host initiating copying of one or more memory pages of the dataset from system memory in the source host to system memory in the destination host.

19. The program product of claim 15, wherein:

the dataset includes a plurality of memory pages, each having a respective associated page table entry defining a virtual-to-real address translation for the associated memory page; and the program code further causes the source host to track in a data structure which page table entries for the plurality of memory pages have been migrated to the destination host.

20. The program product of claim 15, wherein performing live migration of the dataset includes:

the source host issuing on a physical system fabric in the source host a store request specifying an address in a system memory of the destination host; and receiving, by a physical link controller in the source host that is physically and communicatively coupled to the system fabric and to the communication link, the store request on the system fabric and, based on the address, transmitting the store request via the communication link to a memory controller within the destination host.

21. The program product of claim 15, wherein performing live migration of the dataset includes the source host performing a bulk flush of all memory pages in the dataset that are subject to update by the source host from the caches of the source host to system memory.

* * * * *